(12) United States Patent
Takeda et al.

(10) Patent No.: US 7,326,451 B2
(45) Date of Patent: Feb. 5, 2008

(54) ROTATORY POLARIZATION PLATE, OPTICAL ELEMENT, LIGHT CONDENSATION BACKLIGHT SYSTEM AND LIQUID CRYSTAL DISPLAY

(75) Inventors: Kentarou Takeda, Ibaraki (JP); Kazutaka Hara, Ibaraki (JP); Naoki Takahashi, Ibaraki (JP); Miki Shiraogawa, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 470 days.

(21) Appl. No.: 10/969,055

(22) Filed: Oct. 21, 2004

(65) Prior Publication Data

US 2005/0088740 A1   Apr. 28, 2005

(30) Foreign Application Priority Data

Oct. 23, 2003   (JP)   ............... 2003-363199

(51) Int. Cl.
*G02F 1/3363*   (2006.01)
*G02B 5/30*   (2006.01)

(52) U.S. Cl. ................ 428/1.31; 428/1.1; 349/18; 349/96; 349/98

(58) Field of Classification Search ............ 428/1.1, 428/1.3, 1.31; 349/18, 96, 98–99, 102–103, 349/115, 185
See application file for complete search history.

(56) References Cited

U.S. PATENT DOCUMENTS

| | | | |
|---|---|---|---|
| 3,052,152 A * | 9/1962 | Koester | ............ 359/386 |
| 4,984,872 A | 1/1991 | Vick | |
| 5,089,883 A | 2/1992 | Welker et al. | |
| 5,206,752 A * | 4/1993 | Itoh et al. | ............ 349/183 |
| 5,576,854 A * | 11/1996 | Schmidt et al. | ............ 349/5 |
| 6,307,604 B1 | 10/2001 | Hikmet et al. | |
| 6,627,270 B1 * | 9/2003 | Nishimura | ............ 428/1.3 |
| 2002/0034009 A1 | 3/2002 | Broer et al. | |
| 2002/0036735 A1 | 3/2002 | Arakawa et al. | |
| 2002/0159019 A1 * | 10/2002 | Pokorny et al. | ............ 349/187 |
| 2003/0063236 A1 | 4/2003 | Watson et al. | |
| 2003/0089956 A1 | 5/2003 | Allen et al. | |

FOREIGN PATENT DOCUMENTS

| | | |
|---|---|---|
| DE | 3836955 | 5/1990 |
| DE | 4222028 | 1/1994 |
| EP | 0 578 302 | 6/1993 |
| JP | 64-57203 | 3/1989 |
| JP | 2-158289 | 6/1990 |
| JP | 6-235900 | 8/1994 |
| JP | 2561483 | 9/1996 |
| JP | 10-321025 | 12/1998 |
| JP | 2002-90535 | 3/2002 |

(Continued)

*Primary Examiner*—Rena Dye
*Assistant Examiner*—Sow-Fun Hon
(74) *Attorney, Agent, or Firm*—Westerman, Hattori, Daniels & Adrian, LLP.

(57) ABSTRACT

A rotatory polarization plate capable of extracting an emission polarized light from an incident polarized light and rotating an azimuth angle of an polarization axis of the incident polarized light, wherein a rotatory polarization angle of the azimuth angle is changed by an incidence angle of the incident polarized light, is useful for an optical element capable of condensing and collimating incident light from a light source in a specific direction.

10 Claims, 10 Drawing Sheets

FOREIGN PATENT DOCUMENTS

| | | |
|---|---|---|
| JP | 2002-258048 | 9/2002 |
| JP | 2004-4763 | 1/2004 |
| JP | 2004-4764 | 1/2004 |
| WO | WO 98/49585 | 11/1998 |
| WO | WO 99/09452 | 2/1999 |
| WO | WO 02/25687 | 3/2002 |
| WO | WO 03/27731 | 4/2003 |
| WO | WO 03/27756 | 4/2003 |

* cited by examiner

[Fig. 1]
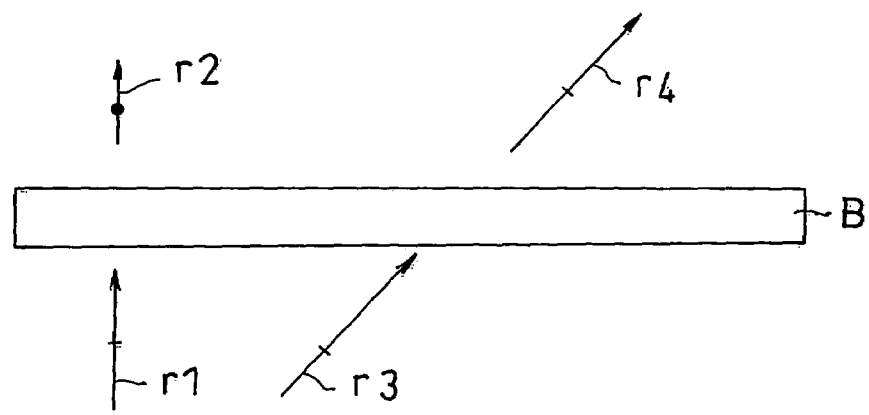
[Fig. 2]
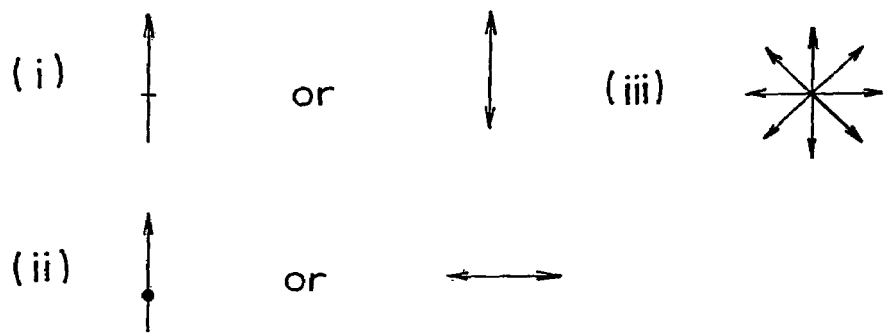
[Fig. 3]
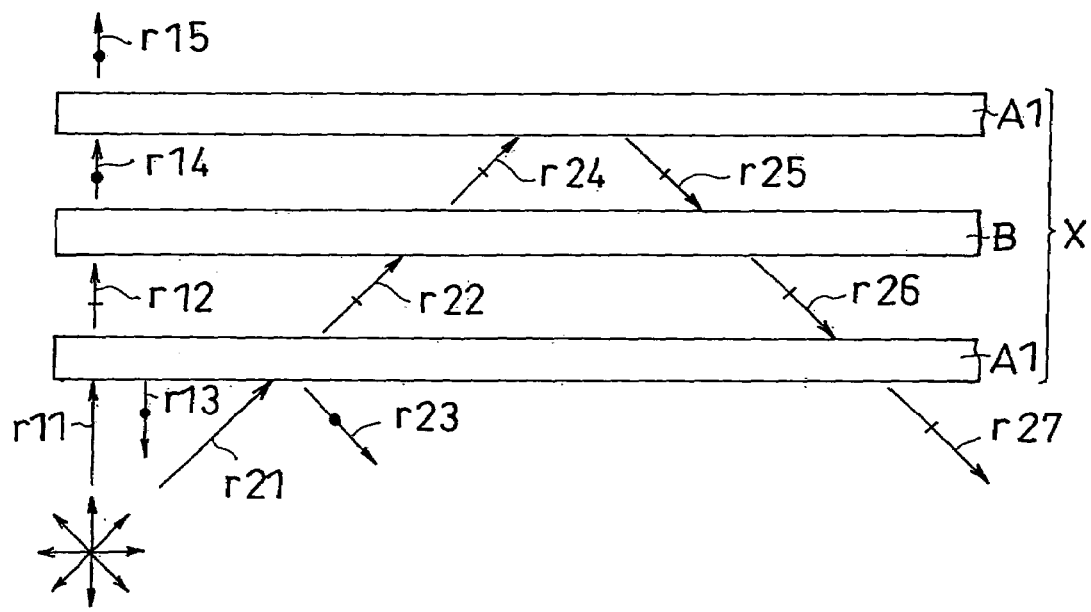

[Fig.4]
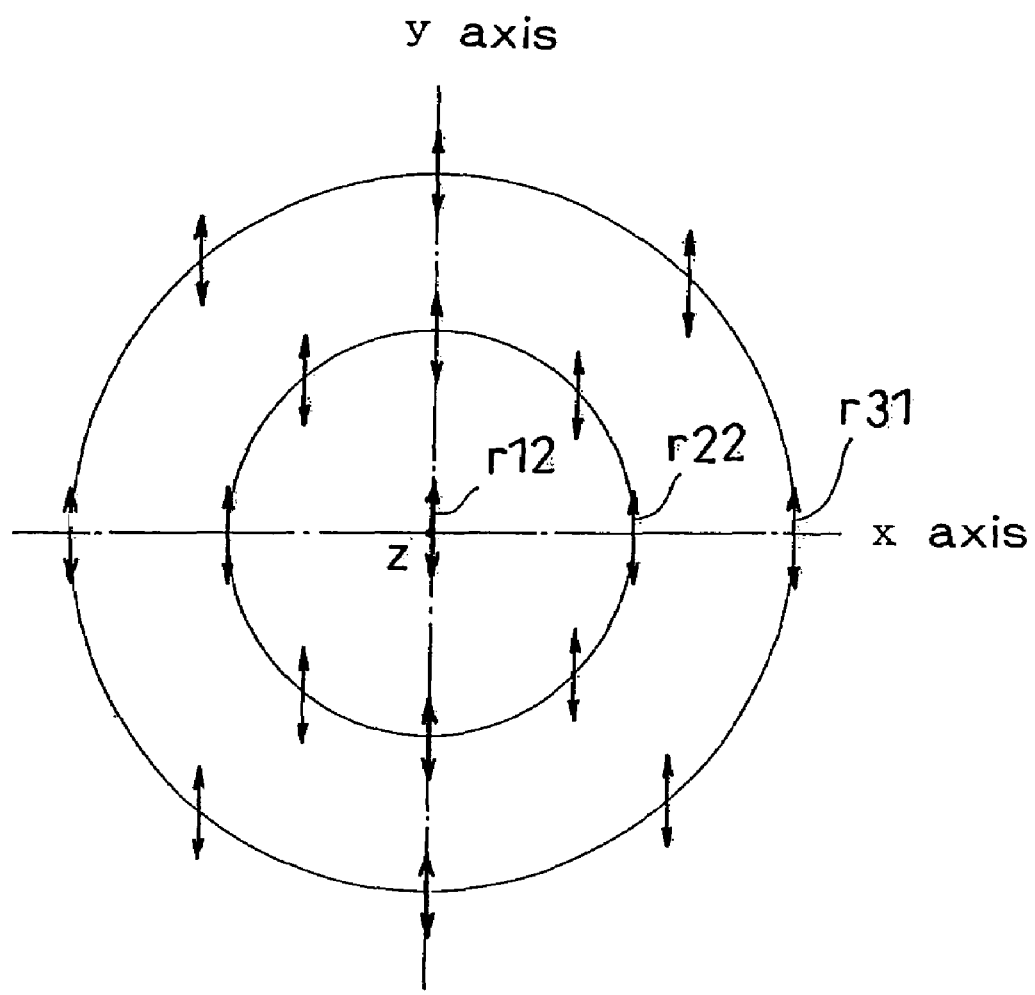

[Fig.5]
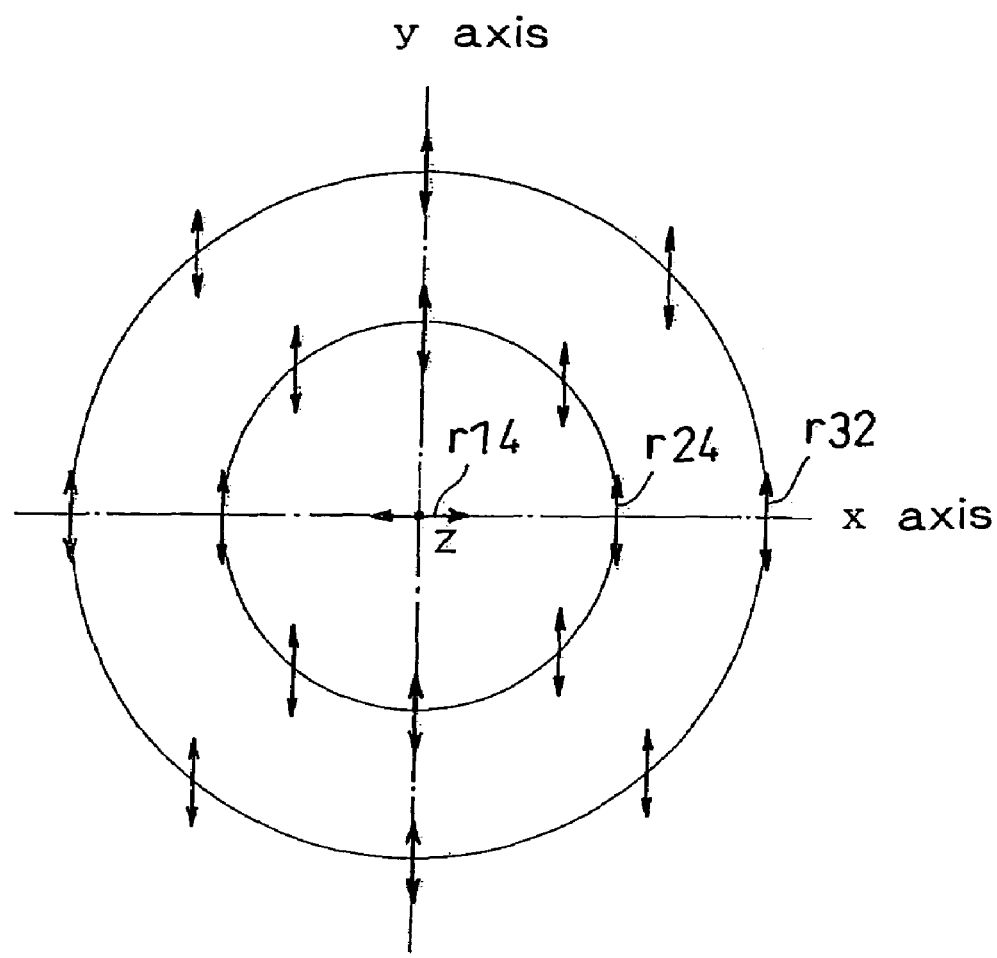

[Fig.6]
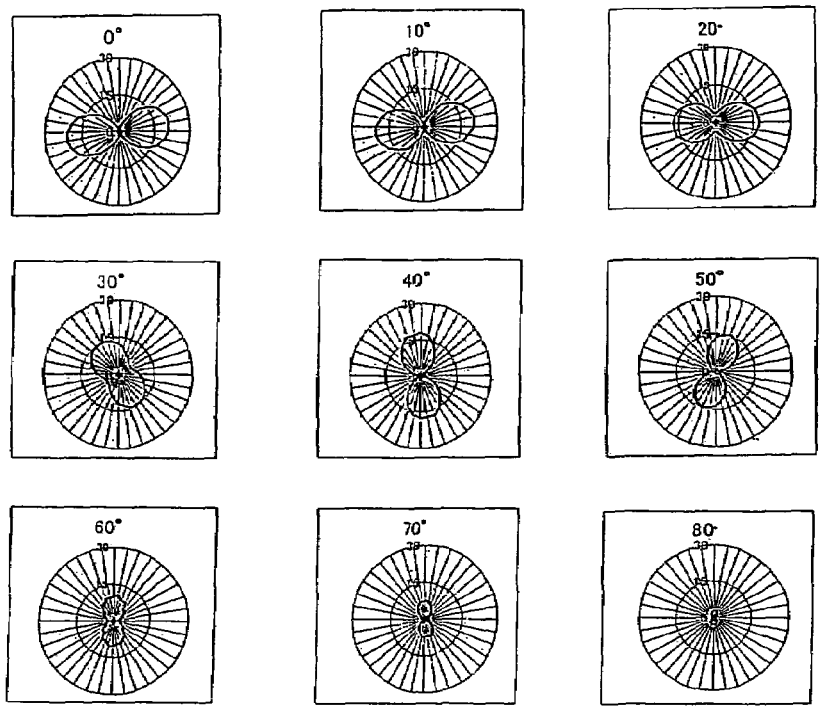
[Fig.7]
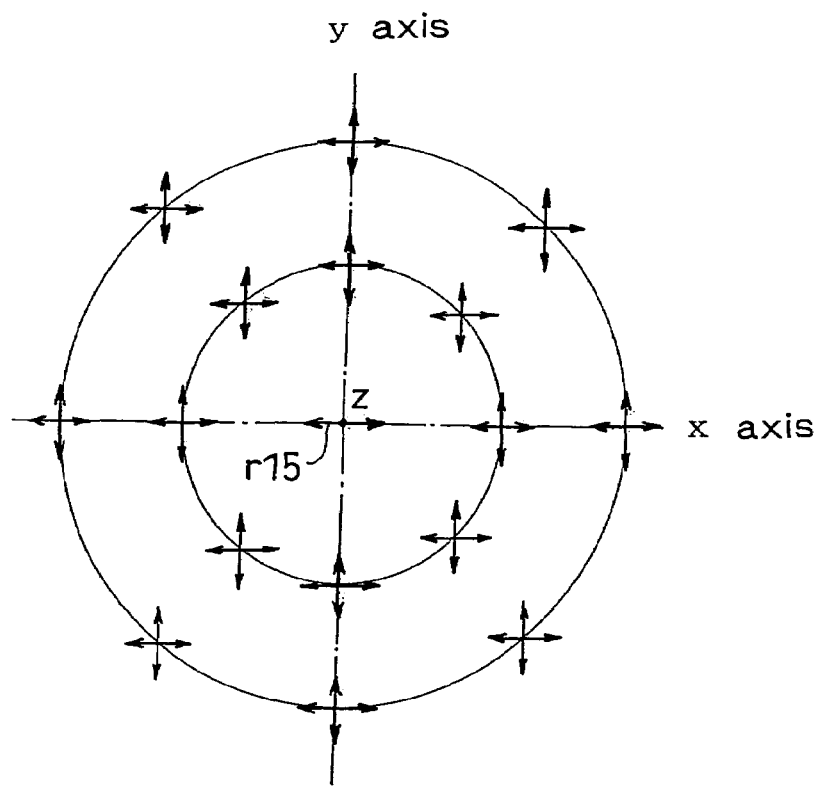

[Fig. 8]
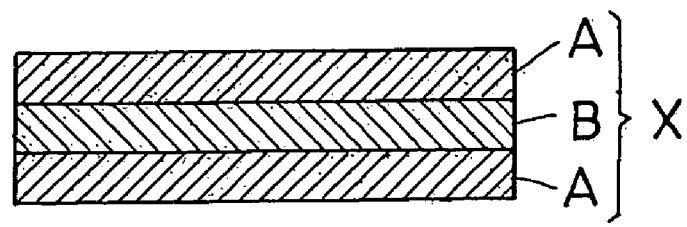
[Fig. 9]
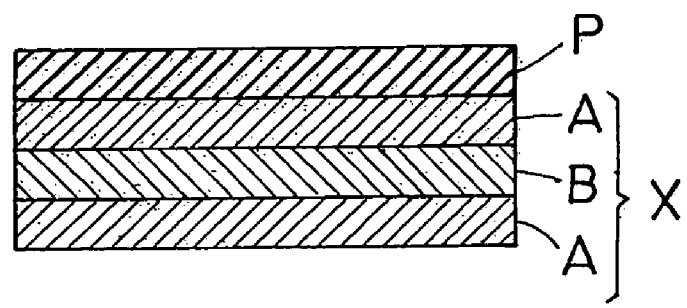
[Fig. 10]
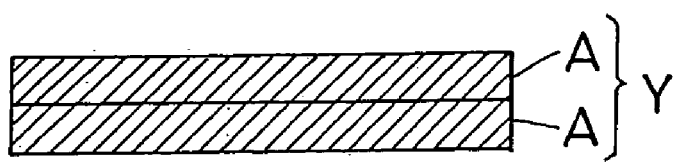

[Fig. 11]
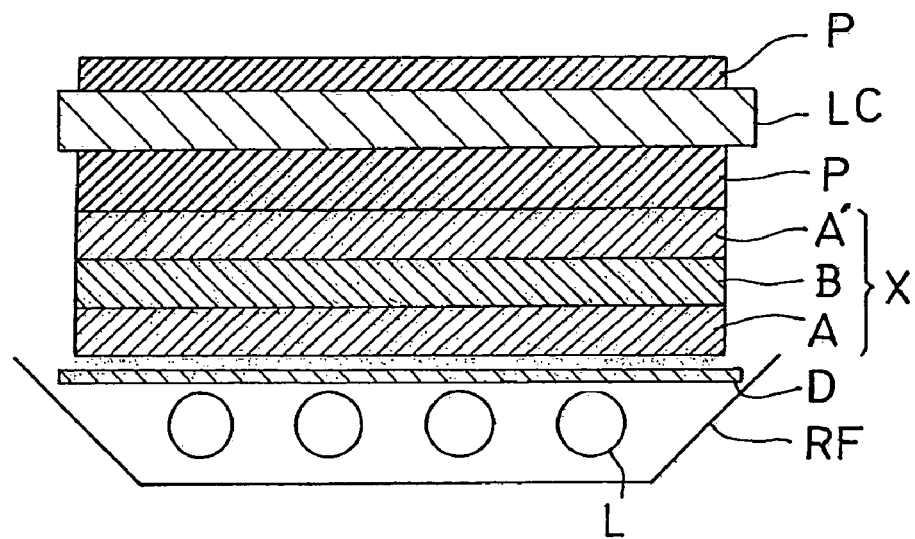
[Fig. 12]
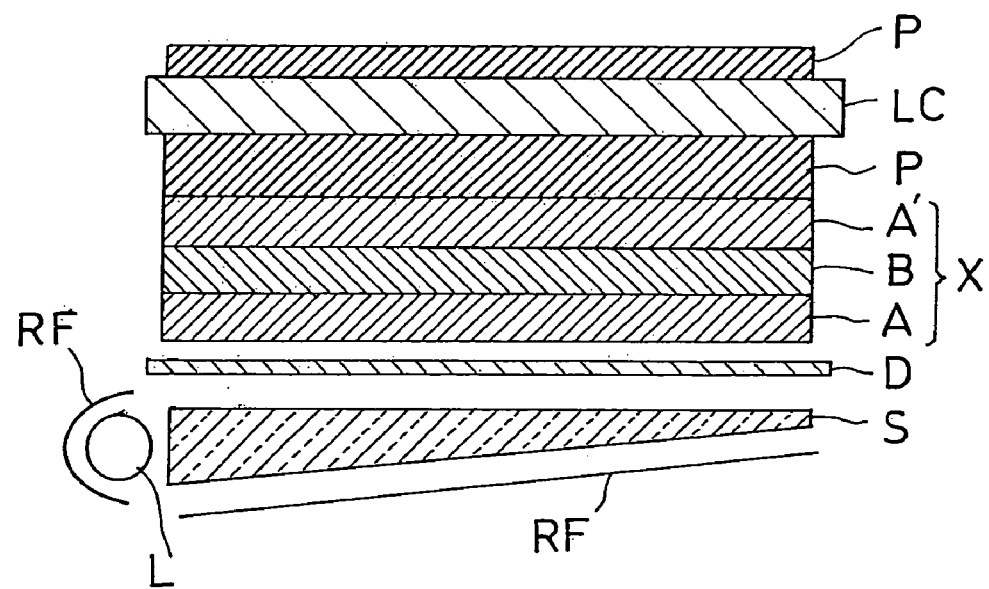

[Fig. 13]
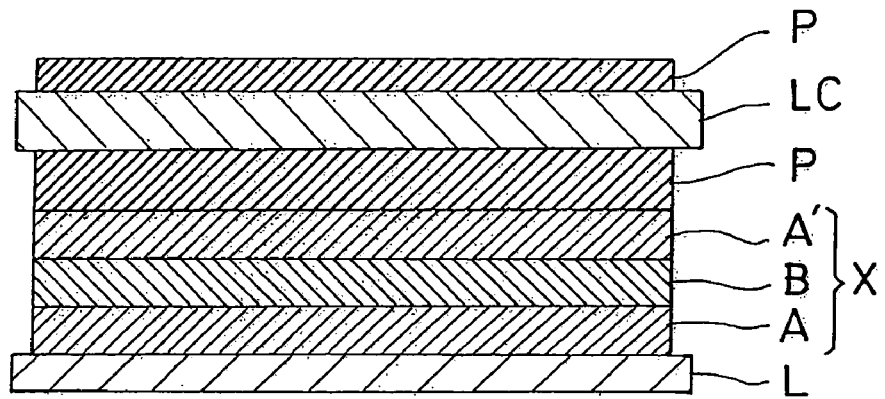
[Fig. 14]
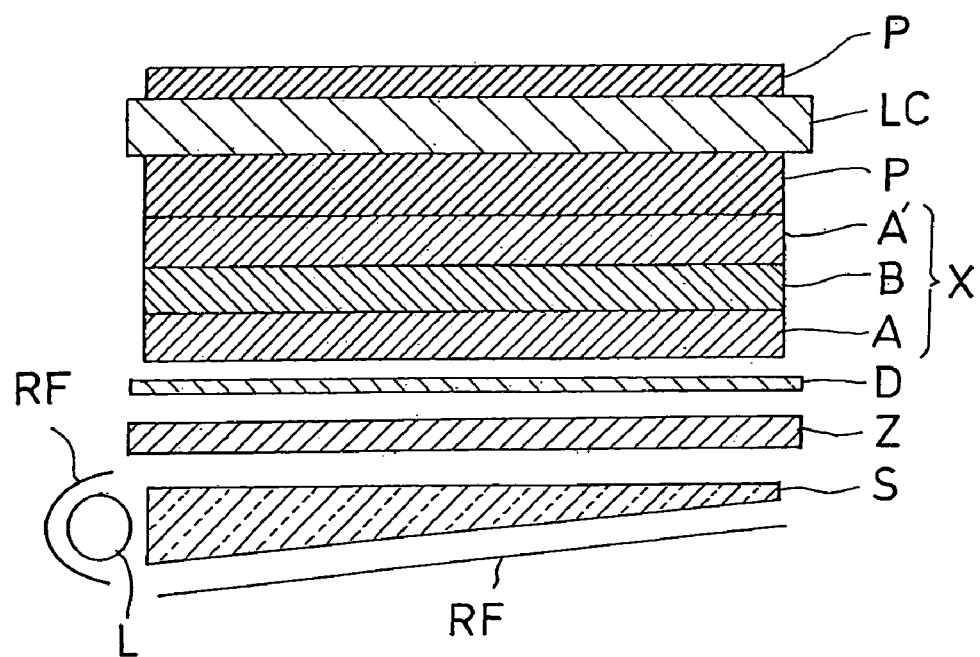

[Fig. 15]
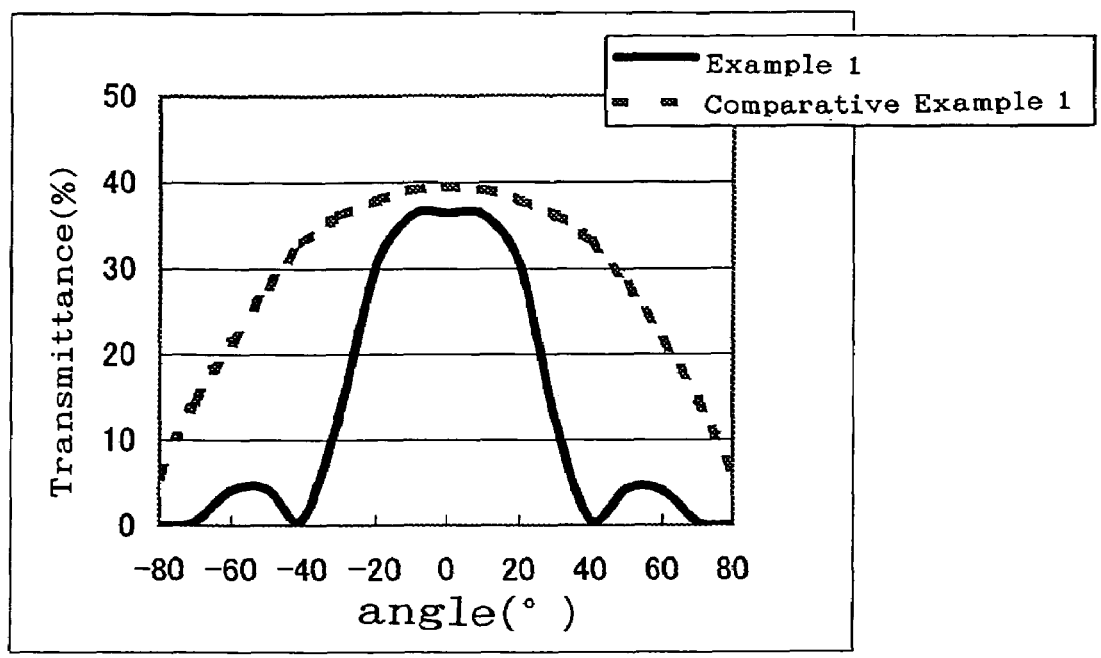
[Fig. 16]
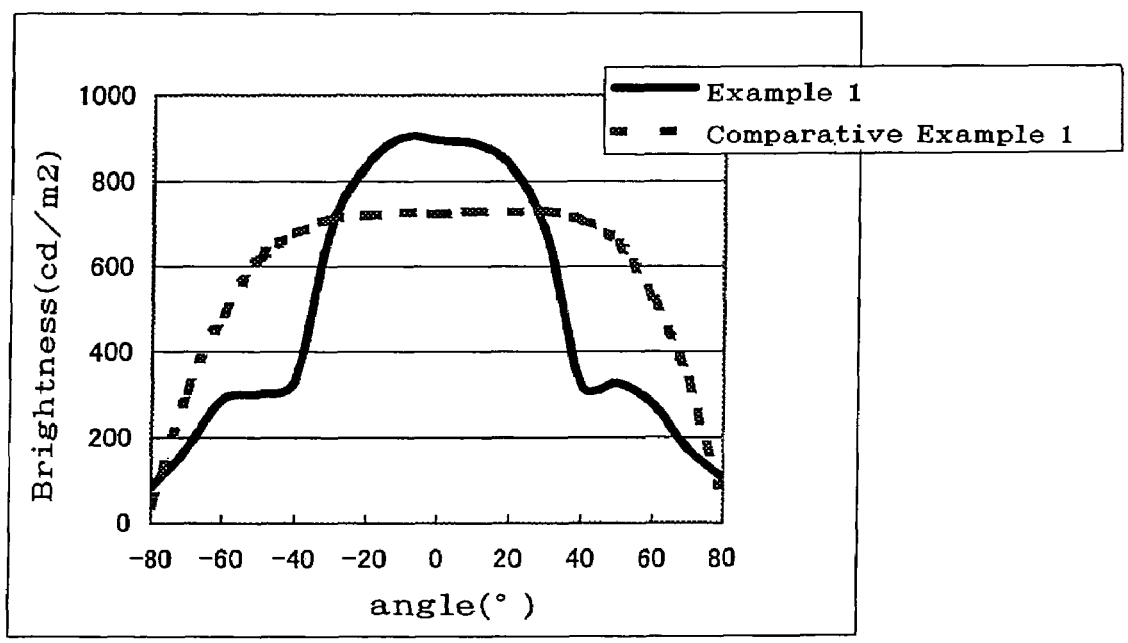

[Fig. 17]
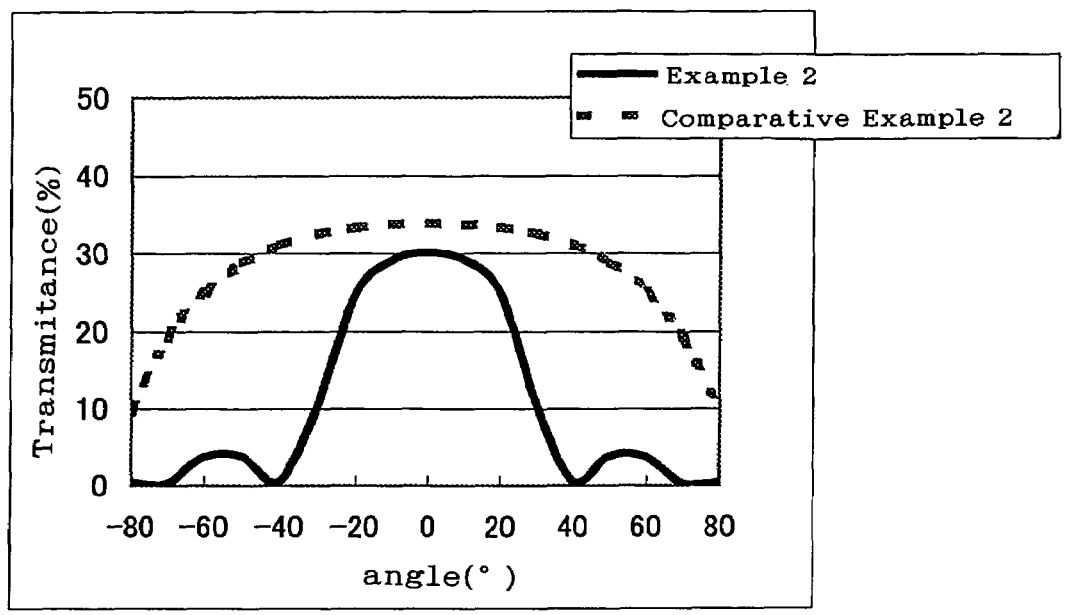
[Fig. 18]
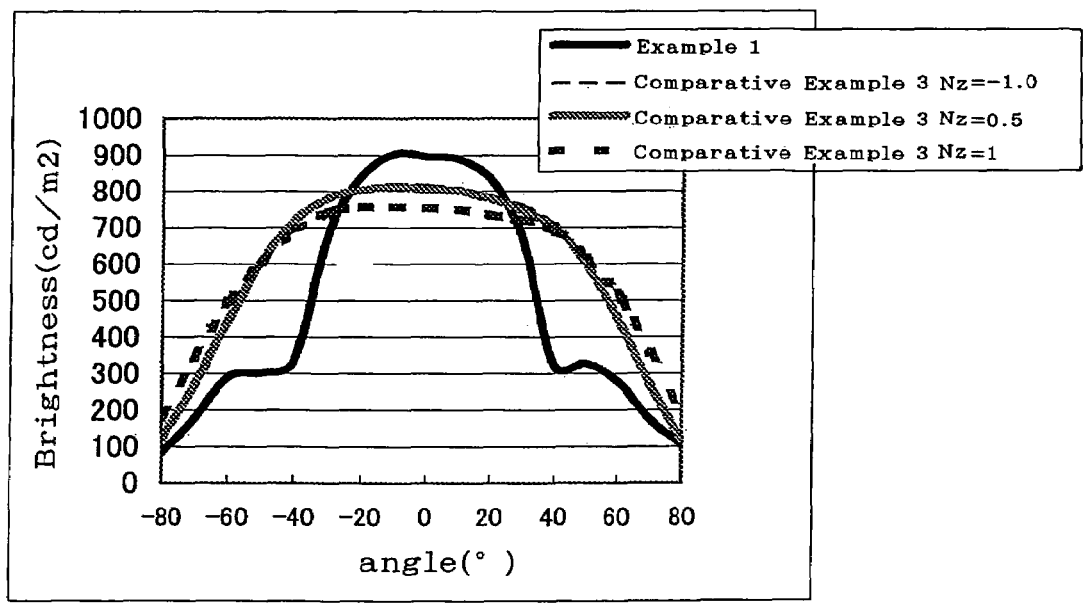

[Fig. 19]
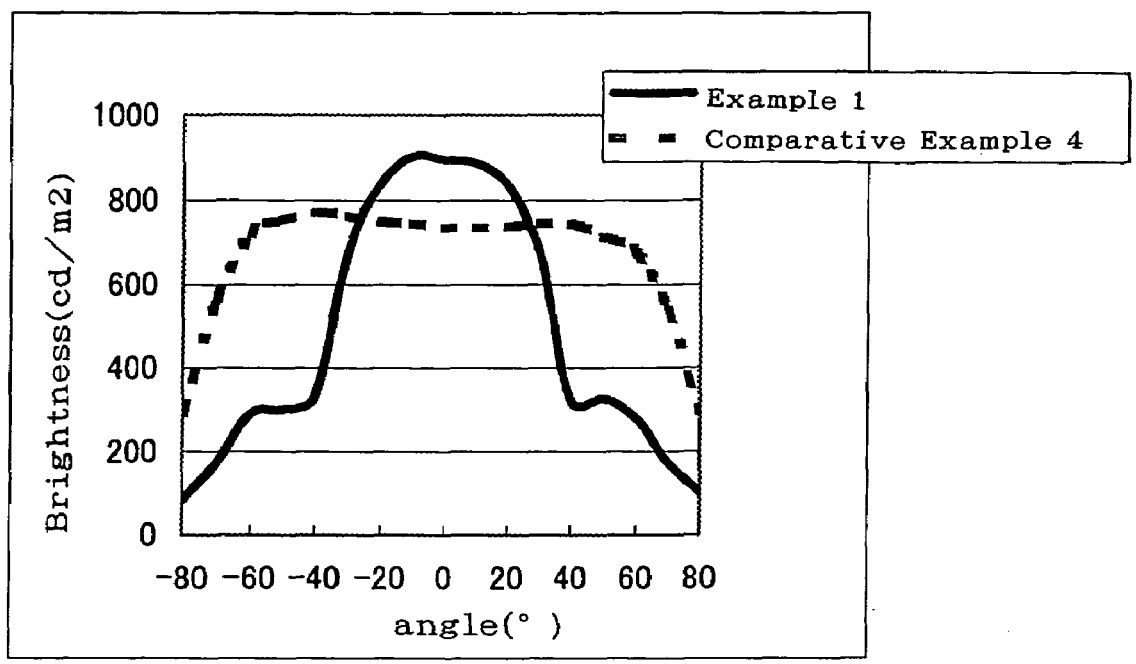

ROTATORY POLARIZATION PLATE, OPTICAL ELEMENT, LIGHT CONDENSATION BACKLIGHT SYSTEM AND LIQUID CRYSTAL DISPLAY

BACKGROUND OF THE INVENTION

1. Field of the Invention

The present invention relates to a rotatory polarization plate. This invention further relates an optical element using the rotatory polarization plate and a polarizing element. This invention further relates to a light condensation backlight system using the optical element and still further to a liquid crystal display using the same.

2. Description of the Related Art

There has been conventionally conducted a trial to condense or collimate light from a diffusion light source using an optical film having a flat front surface or to control a transmittance of light therefrom in a specific direction of the optical film having a flat front surface. A typical example of such a trial is a method in which a bright line light source is combined with a band pass filter (see, for example, a publication of JP-A No. 6-235900, a publication of JP-A No. 2-158289, a publication of JP-A No. 10-321025, a specification of U.S. Pat. No. 6,307,604, a specification of DE 3836955 A, a specification of DE 4222028 A, a specification of EP 578302 A, a specification of USP 2002/34009 A and a pamphlet of WO 02/25687 A1). There has been proposed a method in which a band pass filter is disposed on a CRT, or a display with a light source emitting a bright line such as electroluminescence to thereby condense and collimate light; or the like (see, for example, a pamphlet of WO 98/49585 A1, a pamphlet of WO 99/09452 A1, a specification of USP 2002/036735 A, a publication of JP-A No. 2002-90535 and a publication of JP-A No. 2002-258048).

A method has been proposed in which polarization and retardation are combined with each other or the like (see a specification of JP No. 2561483). An optical element has been proposed, in other patent literatures, that is constituted of a reflection polarizer-a rotatory polarization plate-a reflection polarizer (see a specification of U.S. Pat. No. 4,984,872, a specification of USP 2003/63236 A and a pamphlet of WO 03/27731 A1). An optical element has been proposed that uses a hologram material (see a pamphlet of WO 03/27756 A1).

In a method in which a bright line spectrum is used as an optical film imparting directivity to a diffusion light source, however, since a requirement is a high precision level related to wavelength matching between a kind of a light source and a band pass filter, which has made fabrication thereof difficult. On the other hand, no large problem occurs in a case where a monochromatic light is used, whereas in a case where adaptation is required for the three primary colors, coloration is felt unless transmittance of the colors changes at the same ratio according an incidence angle. Therefore, in combination of a bright line light source and a band pass filter, a requirement is a precise matching of a wavelength of the light source with a band pass filter, which is high in technical difficulty.

For example, in the publications of JP-A 2002-90535 and JP-A 2002-258048, used for light condensation in the front direction is a reflecting plate obtained by combining a left circularly polarized light separating plate and a right circularly polarized light separating plate together or alternatively a reflecting plate obtained by inserting a ½ wavelength plate between circularly polarized light separating plates with the same direction of the rotation. In this system, a necessity arises for forming corresponding layers for respective wavelengths of a light source, which necessitates lamination of three sets for color display. This has led to complexity in construction and a high cost.

In a case where polarization and retardation are used, there has arisen a tendency that a secondary transmission region emerges at a further larger incidence angle if an emittable angle range is narrowed.

In a case where obliquely incident light passes through a retardation plate, there is generally a tendency that an optical path length is longer; and with an increase in optical path length, a difference in optical path length also increases. With combination of this characteristic and a polarizer adopted, it is possible to fabricate a polarizing element having angular dependency of transmittance as taught in the specification of JP 2561483. Such a polarizing element can change a transmittance according to an incidence angle. For example, with such a polarizing element, it is possible that a transmittance in the front direction is higher, while a transmittance of an obliquely incident light is lower.

If a layer imparting no retardation in the front direction and a retardation of ½ wavelength in an oblique direction is inserted between optical elements separating circularly polarized light in the same direction of the rotation, light is totally reflected in an oblique direction; therefore, light is transmitted only in the front direction (see Publication of JP-A No. 10-321025). In this method, however, in a case where a condition that total reflection occurs at a specific angle is set, a problem has been remained that a transmission region emerges at an incidence angle larger than the specific angle. With increase in incidence angle, the length of an optical path is longer and an imparted retardation increases. Hence, a property emerges that light is again transmitted at an incidence angle that imparts a retardation of a ¾ wavelength. Therefore, if a transmission characteristic is confined only in the front direction, a transmission component is, to the contrary, generated in an oblique direction, which has become a trouble.

The specification of USP 2003/63236 and the pamphlets of WO 03/27731 A1 and WO 03/27756 A1 all improve a productivity of reflection polarizer laminates for use in transflective by enabling a production according to a roll-to-roll method by use of a rotatory polarizer, as solution of a problem of reduction in productivity and decrease in area yield which have been caused by fabricating the reflection polarizer laminates through lamination having a small displacement in angular registration. In such a general combination of a reflection polarizer-a rotatory polarization plate-a reflection polarizer, there has been no chance that an angular dependency of a transmittance occurs. In a general polarizer using a laminate of a chiral material and a retardation plate such as quartz crystal and saccharose, it is difficult to fabricate the rotatory polarizer, while intentionally controlling a retardation plate having a rotatory polarization characteristic changed by an incidence angle.

It has been generally known that a rotatory polarization effect can be obtained by disposing a ½ wavelength plate and controlling an angle of the axis direction relative to the polarization axis of incident polarized light. A ½ wavelength plate, however, exerts a rotatory polarization function to vertically incident polarized light, whereas the plate cannot control a rotatory polarization angle uniformly for polarized light passing through in oblique directions. This is because a ½ wavelength plate itself has the axis thereon; therefore, an azimuth angle of the polarization axis relative to the axis of the plate is different according to an incidence angle. A rotatory polarizer using a chiral material has been known.

Since, in the rotatory polarizer, a rotatory polarization angle is changed simply by an optical path length, a rotatory polarization angle keeps on increase with increase in incidence angle, and phenomenon cannot be observed that a rotatory polarization angle is settled at a particular value, which is desired. In this way, a retardation plate and a rotatory polarizer that have been conventionally available have had no opportunity to enable a transmittance of polarized light to be controlled by an incidence angle.

On the other hand, hologram materials are, in more of cases, expensive, poor in mechanical characteristics, and soft and weak in nature, which have been problematic about long term durability.

As discussed above, conventional optical elements have been problematic because of difficulty in fabrication, hardness in obtaining a target optical characteristic, poor reliability and the like.

SUMMARY OF THE INVENTION

It is an object of the present invention to provide a rotatory polarization plate having an incidence angle dependency that an angle of rotation of an azimuth angle of a polarization axis of an incident polarized light is changed by the incidence angle of the incident polarized light.

It is another object of the present invention to provide an optical element capable of condensing and collimating incident light from a light source in a specific direction using the rotatory polarization plate and a polarizing element.

It is still another object of the present invention to provide a light condensation backlight system using the optical element and in addition, a liquid crystal display.

The present inventors have conducted serious studies in order to solve the tasks with the resulted findings of the rotatory polarization plate and the optical element described below, which has led to completion of this invention. That is, the present invention is as follows:

A rotatory polarization plate capable of extracting a polarized light from an incident polarized light and rotating an azimuth angle of an polarization axis of the incident polarized light, wherein a rotatory polarization angle of the azimuth angle is changed by an incidence angle of the incident polarized light.

In the rotatory polarization plate, the rotatory polarization plate is preferably formed with a cholesteric liquid crystal layer.

In the rotatory polarization plate, all of a selective reflection wavelength band of the rotatory polarization plate formed with the cholesteric liquid crystal layer is preferably in a wavelength region longer than 610 nm.

In rotatory polarization plate, the azimuth angle of the polarization axis of the linearly polarized light is rotated by about 90° when, in the normal direction, the linearly polarized light passes through the rotatory polarization plate, and being rotated by about 0° when, at the incidence angle larger than 30°, the linearly polarized light passes through the rotatory polarization plate.

An optical element comprising: a linearly polarizing element (A) and the above-mentioned rotatory polarization plate (B).

In the optical element, the linearly polarizing elements (A) are preferably laminated two or more and the rotatory polarization plate (B) is disposed between the linearly polarizing elements (A) of at least one pair adjacent to each other.

In the optical element, the linearly polarizing element (A) is a linearly polarized light reflection polarizer.

In the optical element, linearly polarizing element (A) is a linearly polarized light absorption polarizer.

In the optical element, the linearly polarizing element (A) is a polarized light emitting element.

In the optical element, the linearly polarizing element (A) is a total light transmission polarizing element.

In the optical element, each of layers is laminated with a light translucent adhesive or pressure-sensitive adhesive.

A light condensation backlight system comprising at least: a light source and the above-mentioned optical element.

A liquid crystal display comprising at least: a liquid crystal cell and the light condensation backlight system.

In the liquid crystal display, preferably further comprising a diffusion plate having neither backscattering nor polarization cancellation laminated on a viewer side of the liquid crystal cell.

A rotatory polarization plate of the present invention changes an angle, by which an azimuth angle of a polarization axis of an incident polarized light is rotated, according to an incidence angle of the incident polarized light. Such a rotatory polarization plate having incidence angle dependency can be obtained, for example, with a cholesteric liquid crystal. Since a relationship between a rotatory polarization angle of the rotatory polarization plate and the incidence angle is changed by the thickness of a cholesteric liquid crystal layer or a selective reflection wavelength band, it can be adjusted by controlling the factors.

A rotatory polarization plate formed with a cholesteric liquid crystal layer has a peculiar phenomenon in a case where a selective reflection wavelength band thereof is in the wavelength side longer than the visible light region. That is, in the course of the present invention, it was found that a rotatory polarization plate works as an ordinary rotatory polarization plate in the normal direction (the front direction), while a rotatory polarization angle changes with increase in incidence angle in an oblique direction and the rotatory polarization angle converges at a constant value at an incidence angle of a value or more. Even with a cholesteric liquid crystal layer adopted, however, in a case where a twist pitch is so large that Morgan's condition ($\lambda<<P \cdot \Delta n$ wherein $\lambda$ is a wavelength, P is a twist pitch and $\Delta n$ is a birefringence difference) is met, that is in a case where no selective reflection wavelength band is shown even if the thickness of a cholesteric liquid crystal layer is about 5 μm, the rotatory polarization plate is not angular dependent. For example, in a case where alignment is implemented so that, as is in a TN or STN liquid crystal cell, a liquid crystal with a thickness of about 5 μm is rotated by 90° and 270°, rotatory polarization can be caused, whereas since in the case, a rotatory polarization angle is the same despite a change in an incidence angle of light, the liquid crystal layer does not works as a rotatory polarization plate with angular dependency.

The rotatory polarization plate having an angular dependency of the present invention can be obtained by laminating cholesteric liquid crystal layers having a selective reflection wavelength band in a wavelength side longer than the visible light region. Since a cholesteric liquid crystal layer in the selective reflection wavelength band has retardation in the normal direction of almost zero, it is hard to be thought that the rotatory polarization plate of this invention rotates due to retardation. In addition, if the rotatory polarization was caused to rotate by retardation, the polarization state would have to change in a case other than a retardation of ½λ, whereas no change in polarization state occurs in the case. Since a cholesteric liquid crystal layer having a selective reflection wavelength band in a wavelength side longer than the visible light region does not meet a condition for rotatory polarization, the cholesteric liquid crystal layer does not show a rotatory polarization in a cholesteric liquid crystal occurring in a TN liquid crystal cell or the like. The rotatory polarization plate having angular dependency of this invention shows a phenomenon which cannot be explained with retardation and rotatory polarization property in the cholesteric liquid crystal layer.

Note that according to Takezoe (Jpn, J. Appl. Phys., 22, 1080 (1983)), a phenomenon was reported that in a case where a cholesteric liquid crystal layer high in birefringence is aligned to a thickness as large as tens of μm, incident light having a large incidence angle is totally reflected without transmission. In the literature, however, no description was given of a rotatory polarization plate having incidence angle dependency.

A rotatory polarization plate of the present invention can be formed with a cholesteric liquid crystal layer having a selective reflection wavelength band in a wavelength side longer than the visible light region. As the rotatory polarization plate, exemplified are all of that each with a selective reflection wavelength band in a wavelength region longer than 610 nm. The selective reflection wavelength band is preferably in a wavelength side longer than 700 nm and more preferably 800 nm. If the selective reflection wavelength band is in the visible light region shorter than 610 nm, it is difficult to obtain a rotatory polarization plate having the above described characteristic. Note that a width of the selective reflection wavelength band is preferably in the range of 650 to 3000 nm and more preferably in the range of 700 to 2000 nm.

A rotatory polarization plate formed with such a cholesteric liquid crystal layer can rotate an azimuth angle of a polarization axis of a linearly polarized light by about 90° when, in the normal direction, the linearly polarized light passes through the rotatory polarization plate, and by about 0° when an incidence angle of the linearly polarized light is larger than 30°. Note that the term "about 90°" means 90°±20° and the term "about 0°" means 0°±20°.

Description will be given of a case where a rotatory polarization plate having the above described characteristic is employed as a rotatory polarization plate (B) below. In FIG. 1, there is shown a conceptual representation in which a linearly polarized light passes through the rotatory polarization plate (B) and emitted therefrom. As shown in FIG. 2, (i) indicates a linearly polarized light, (ii) is a linearly polarized light perpendicular to the linearly polarized light (i). A symbol (iii) indicates natural light.

A linearly polarized light (r1) passes through the rotatory polarization plate (B) in the normal direction rotates the azimuth angle of the polarization axis by about 90° and a linearly polarized light (r2) about perpendicular to the linearly polarized light (r1) is emitted from the rotatory polarization plate (B). On the other hand, when a linearly polarized light (r3) passes through the rotatory polarization plate (B) at an incidence angle larger than 30°, an azimuth angle of the polarization axis rotates by about 0° to emit a linearly polarized light (r4) having the same azimuth angle as the linearly polarized light (r1).

The rotatory polarization plate (B) can be used in combination with a linearly polarizing element (A). For example, the rotatory polarization plate (B) can be used, as shown in FIG. 8, as an optical element (X) of a structure in which the rotatory polarization plate (B) is inserted between two linearly polarizing elements (A). In this case, the two linearly polarizing elements (A) are disposed so that a polarization axes thereof are almost perpendicular to each other to thereby enable a peculiar optical element to be obtained in which a transmittance increases in the normal direction (front direction), while with increase in incidence angle, the transmittance decreases to reach a low transmittance which is kept stable at the value thereof at an incidence angle of 30° or more. In a case where as the linearly polarizing element (A), a linearly polarized light reflection polarizer (A1) is employed, a linearly polarized light that cannot be transmitted is reflected and can be recycled. In the case where the two linearly polarized light reflection polarizers (A1) are employed, the polarizers (A1) are arranged so that a polarized light transmission axes thereof or a polarized light reflection axes thereof are almost perpendicular to each other. In such an optical element (X), no increase in transmittance occurs again even with increase in incidence angle to thereby enable a stable reflectance to be attained. The rotatory polarization angle of the rotatory polarization plate can be changed by a thickness of the cholesteric liquid crystal layer. Therefore, if a rotatory polarization plate having a changed rotatory polarization angle is used, an optical element having angular dependency of transmittance can be attained even if two linearly polarizing elements (A) are arranged so that the polarization axes thereof are not about perpendicular or in parallel as described later with each other In FIG. 3, there is shown a conceptual representation in which natural light passes through an optical element (X) in arrangement in the order of a linearly polarized light reflection polarizer (A1)/a rotatory polarization plate (B)/a linearly polarized light reflection polarizer (A1) and then emitted therefrom. As shown in FIG. 3, in the normal direction, a linearly polarized light is transmitted and emitted, while being reflected in a case where an incidence angle is larger than 30°.

A linearly polarized light reflection polarizer (A1) transmits all linearly polarized light in the same axis direction of natural light emitted from a light source despite an incidence angle. On the other hand, a linearly polarized light perpendicular to the linearly polarized light is reflected. That is, a light (r11) in the normal direction is separated into a transmitted linearly polarized light (r12) and a reflected linearly polarized light (r13) by the linearly polarized light reflection polarizer (A1). The linearly polarized light (r12) and the linearly polarized light (r13) are perpendicular to each other in terms of a polarization direction. A light (r21) having an incidence angle larger than 30° is also separated into a transmitted linearly polarized light (r22) and a reflected linearly polarized light (r23) by the linearly polarized light reflection polarizer (A1). The linearly polarized light (r22) and the linearly polarized light (r23) are perpendicular to each other in terms of a polarization direction.

In FIG. 4, there is shown a conceptual representation when a polarization state of transmitted light this time is viewed in the normal direction (z axis). All transmitted light is a linearly polarized light in the same direction (y axis). A linearly polarized light (31) is transmitted even in a case where an incidence angle is larger than the linearly polarized light (r22).

Then, description will be given of linearly polarized light transmitted through the rotatory polarization plate (B). The rotatory polarization plate (B) rotates an azimuth angle of the polarization axis of a linearly polarized light by about 90° in the normal direction. Therefore, in the normal direction, a linearly polarized light (r14) perpendicular to the linearly polarized light (r12) is transmitted. The rotatory polarization plate (B) rotates the azimuth angle of the polarization axis of the linearly polarized light by about 0° at an incidence angle larger than 30°. Therefore, a linearly polarized light (r24) having the same axis direction as the linearly polarized light (r22) is transmitted at an incidence angle larger than 30°.

In FIG. 5, there is shown a conceptual representation when a polarization state of transmitted light this time is viewed in the normal direction (z axis). In the normal direction (z axis), transmitted light is a linearly polarized light (r14) in the x axis direction, while other all transmitted light is a linearly polarized light (r24 and r23) in the y axis direction. In a case where an incidence angle is larger, a linearly polarized light (r32) is also transmitted.

In FIG. 6, there is shown states of polarization of transmitted light in a case where an angle from the normal direction is increased. A polarization state was obtained through measurement of transmittance with MOPD 3000 manufactured by Otsuka Electronics Co., Ltd. In the procedure, a linearly polarized light reflection polarizer (A1)+a rotatory polarization plate (B) were set and a Glan-Thompson analyzer is placed between the composite and a light receptor. The analyzer was rotated in increments of an angle of 10° and transmittance was measured in each increment. Such measurement was repeated till a rotation angle of the analyzer reaches 360° in accumulated value and transmittance values with a wavelength of 550 nm at angles of the analyzer were compiled as radar graphs. In this process, polarization states of circularly polarized light assume a circle in graph and polarization states of linearly polarized light assume a diagram in the shape of a numeral of 8. A direction along a line connecting the maximum value of transmittance and the original point is the azimuth angle of the polarized light. It is recognized from FIG. 6 that a direction of polarized light changes with increase in angle from the normal direction.

Then, a description will be given of a linearly polarized light passing through the second linearly polarized light reflection polarizer (A1). The linearly polarized light reflection polarizers (A1) on both sides of the rotatory polarization plate (B) are arranged so that the polarized light transmission axes thereof are perpendicular to each other. That is, the polarization axis of the linearly polarized light (r14) in the normal direction having been transmitted through the rotatory polarization plate (B) is in parallel with the polarized light transmission axis of the linearly polarized light reflection polarizer (A1) through which the linearly polarized light (r14) is transmitted later. Therefore, the linearly polarized light (r14) is transmitted through the linearly polarized light reflection polarizer (A1) while keeping the polarization direction to emit a linearly polarized light (r15). On the other hand, the polarization axis of linearly polarized light (r24) in the normal direction having been transmitted through the rotatory polarization plate (B) is perpendicular to the polarized light transmission axis of the linearly polarized light reflection polarizer (A1) through which the linearly polarized light (r24) is transmitted later. Therefore, the linearly polarized light (r24) is reflected on the linearly polarized reflection polarizer (A1) to become a linearly polarized light (r25). The reflected linearly polarized light (r25) is rotated again in the rotatory polarization plate (B) to become a linearly polarized light (r26) and the linearly polarized light (r26) is transmitted through the linearly polarized light reflection polarizer (A1) in the side of the light source to become a linearly polarized light (r27) and the linearly polarized light (r27) is returned back to the light source section.

In FIG. 7, there is shown a conceptual representation in states of polarization of transmitted light this time as viewed in the normal direction (z axis). In the normal direction (z axis), the linearly polarized light (r14) in the x axis direction is transmitted. Reflection occurs at two arrow marks combined in cross in the other cases. Refection also occurs in a case where an incidence angle is large.

The optical element (X) can construct a backlight system by being disposed on the light source. If a diffusion reflector plate is disposed below the light source not only to cancel polarization but to change a light direction, a part of returned light is repeatedly reflected till the part becomes a polarized light transmitted through the linearly polarized reflection polarizer (A1) in the vicinity of the normal direction to thereby contribute to enhance brightness; therefore, the optical element can be used in light collimating backlight system.

In the optical element (X), the two linearly polarizing element (A) can be arranged so that the polarization axes thereof are about in parallel with each other. In this case, contrary to FIG. 3,a linearly polarized light in the normal direction having been transmitted through the rotatory polarization plate (B) and a polarized light transmission axis of the linearly polarized light reflection polarizer (A1) disposed thereon are in an perpendicular relationship. Therefore, a peculiar optical element (not shown) can be obtained in which light in the normal direction is reflected, while on the other hand, incident light with an incidence angle of 30° or larger is transmitted.

A change in axis direction for disposing the linearly polarizing element (A) as described above enables transmittance only in a specific direction to be controlled with ease. By using a rotatory polarization plate (B) of a different kind and having a different kind of a rotation angle of an azimuth angle, transmittance can also be controlled.

The optical element (X) is disposed in a light source side of a liquid crystal display as a linearly polarizing element and thereby works as an optical element to achieve compatibility between brightness enhancement and light condensation. Since the optical element shown in FIG. 3 has no absorption loss intrinsically to thereby reflect all of light at angle not passes through a liquid crystal display to the light source side and recycles the light, emitting light from the light source in an oblique direction has an outlet only in the front direction and thereby is substantially condensed. With this effect, a light collimating backlight system can be formed in which transmission of light passing through at a large angle relative the normal direction can be suppressed to thereby realize enhancement on front brightness and polarization degree and to decrease coloration. That is, a liquid crystal display having the optical element disposed on light condensation and collimating backlight source can use light only in a region high in display quality in the vicinity of the front.

Since an optical element of the present invention does not require an air interface, which is dissimilar to cases of a conventional lens sheet or a prism sheet, it can be used as a laminate in single piece obtained by adhering itself to a polarizing plate, and is also useful in handleability. A great effect is exerted in realizing a thin type. Since the optical element has no regularity structure visually recognizable as in a prism structure, a moiré or the like is hard to occur and has advantages in removal of a diffusing plate or the like decreasing a total light transmittance, or realization of low haze (a total light transmittance is generally increased) with ease. It is naturally not problematical to use the optical element together with a prism sheet or the like. For example, a steep condensation on to the front is performed with a prism sheet or the like, wherein a secondary transmission peak caused by the prism sheet at a large emission angle can be preferably shielded with an optical element of this invention used in combination.

In a conventional backlight device using only a prism sheet, a direction of emission light peak has a tendency that the direction of emission light peak moves away from a light source cold cathode fluorescent lamp. This is because more of light emitted from a light guide plate in an oblique direction is emitted in a direction moving away from the light source cold cathode fluorescent lamp and it is difficult to position peak intensity in the normal direction to the screen. In contrast thereto, by using an optical element according to the present invention, an emission peak is enabled to coincide with the front direction with ease.

A combination of a light condensation backlight source using the optical element and a diffusing plate low in backscattering and generating no cancellation of polarization enables construction of a viewing angle magnification system to be built.

A light condensation backlight system using the optical element having been obtained in this way easily provides a light source higher in light collimation as compared with a conventional practice. Since, in addition, light collimation due to reflective polarization essentially having no absorption loss can be obtained, a reflected non-collimated light component is returned back to the backlight side and recycling during which only a collimated light component is extracted by scattering reflection is repeated, thereby enabling substantially high transmittance and substantially high light utilization efficiency to be obtained.

BRIEF DESCRIPTION OF THE DRAWINGS

FIG. 1 is an example of a conceptual representation rotating a linearly polarized light with a rotatory polarization plate of the present invention.

FIG. 2 is a conceptual representation describing polarized light components and others.

FIG. 3 is an example of a conceptual representation showing a principle of polarization of an optical element (X) of this invention.

FIG. 4 is a conceptual representation showing a polarization axis direction when a polarized light having been transmitted through a linearly polarized light reflection polarizer (A1) of the optical element (X) of this invention is viewed in the normal direction.

FIG. 5 is a conceptual representation showing a direction of the polarization axis when polarized light having been transmitted through a rotatory polarization plate (B) of the optical element (X) of this invention is viewed in the normal direction.

FIG. 6 is a conceptual view showing that a direction of the polarization axis having been transmitted through the rotatory polarization plate (B) of the optical element (X) of this invention is changed by an angle.

FIG. 7 is a conceptual representation showing a direction of the polarization axis when polarized light having been transmitted through the optical element (X) of this invention is viewed in the normal direction.

FIG. 8 is an example of sectional view of the optical element (X) of this invention.

FIG. 9 is an example of sectional view in a case where a polarizing plate (P) is laminated to the optical element (X) of this invention.

FIG. 10 is an example of sectional view of a conventional optical element (Y).

FIG. 11 is an example of sectional view of a liquid crystal display using an optical element (X) of this invention.

FIG. 12 is an example of sectional view of a liquid crystal display using the optical element (X) of this invention.

FIG. 13 is an example of sectional view of a liquid crystal display using the optical element (X) of this invention.

FIG. 14 is an example of sectional view of a liquid crystal display using the optical element (X) of this invention.

FIG. 15 is a graph showing transmittance of Example 1 and Comparative Example 1.

FIG. 16 is a graph showing brightness vs. viewing angle characteristic of Example 1 and Comparative Example 1.

FIG. 17 is a graph showing transmittance of Example 2 and Comparative Example 2.

FIG. 18 is a graph showing brightness vs. viewing angle characteristic of Example 1 and Comparative Example 3.

FIG. 19 is a graph showing brightness vs. viewing angle characteristic of Example 1 and Comparative Example 4.

DESCRIPTION OF THE PREFERRED EMBODIMENTS (Rotatory Polarization Plate (B))

A rotatory polarization plate (B) of the present invention can rotate an azimuth angle of a polarization axis of an incident polarized light to extract an incident polarized light as emission polarized light and a rotation angle of the azimuth angle is changed by an incidence angle of the incident polarized light. Such a rotatory polarization angle (B) can be constituted of a cholesteric liquid crystal layer. The rotatory polarization plate formed with the cholesteric layer can be a cholesteric liquid crystal layer in which a planar alignment thereof is fixed, or a cholesteric liquid crystal polymer coated member. By changing a thickness of a cholesteric liquid crystal layer, a selective reflection wavelength band and the number of laminated layers, an angle by which rotatory polarization can be implemented can be changed in the normal direction (the front direction) or in a case where an incidence angle is large.

A rotatory polarization plate (B) formed with a cholesteric liquid crystal layer preferably has all of a selective reflection wavelength band in a wavelength region longer than 610 nm. Such a rotatory polarization plate (B) can rotate the azimuth angle of the polarization axis of the linearly polarized light by about 90° when the linearly polarized light passes through in the normal direction and by about 0° when the incidence angle linearly polarized is larger than 30°. A thickness of the rotatory polarization plate (B) can be selected properly according to a rotatory polarization angle without specific limitation thereon and in order to shift the polarization axis by a large rotatory polarization angle in the front direction and an oblique direction, a thickness is usually preferably on the order in the range of from 5 to 50 μm.

A proper cholesteric liquid crystal may be used as a cholesteric liquid crystal layer without imposing any specific limitation. Examples thereof that are named include: a liquid crystal polymer exhibiting a cholesteric liquid crystallinity at a high temperature; a polymerized liquid crystal obtained by polymerizing a liquid crystal monomer, and a chiral agent and an alignment agent, when both are required, with illumination of ionizing radiation such as an electron beam, ultraviolet or the like, or with heating; and a mixture thereof. While a liquid crystallinity may be either lyotropic or thermotropic, a thermotropic liquid crystal is desirable from the view point of ease of control and formability of monodomain.

Formation of a cholesteric liquid crystal layer can be performed by means of a method in conformity with a conventional alignment treatment. Exemplified are: a method in which a liquid crystal polymer is developed on a proper alignment film selected from the group: an alignment film obtained by being subjected to a rubbing treatment with a rayon cloth or the like on a film made of polyimide, polyvinyl alcohol, polyester, polyallylate, polyamide imide, polyether imide or the like formed on a support base material having as low a birefringence retardation as possible such as triacetyl cellulose, amorphous polyolefin or the like; an alignment film made of an obliquely evaporated layer made of $SiO_2$; an alignment film made of a base material using a surface nature and state of a stretched base material such as polyethylene terephthalate, polyethylene naphthalate or the like; an alignment film made of a base material with fine surface irregularity of projections and depressions having a fine alignment control force formed thereon obtained by treating a surface thereof with a fine grinding agent represented by a rubbing cloth or red iron oxide; an alignment film made of a base material having an alignment film producing a liquid crystal control force by illuminating an azobenzene compound or the like on a base material film described above with light formed thereon; and others, and the liquid crystal polymer is heated at a temperature of a glass transition temperature or higher and lower than an isotropic phase transition temperature and cooled at a temperature lower than the glass transition temperature in a planar alignment state of the liquid crystal polymer molecules into a glassy state to thereby form a fixed layer in which the alignment is fixed; and other methods. A structure may also be fixed by illuminating with energy such as ultraviolet, an ion beam or the like at a stage where an alignment state is established.

Film formation of a liquid crystal polymer can be performed by means of a method in which a liquid crystal polymer is developed into a thin film using a solution of the liquid crystal polymer with a solvent with one of the following techniques: such as a spin coating method; a roll coating method, a flow coating method; a printing method; a dip coating method; a flow film forming method; a bar coating method; a gravure printing method and others, to further dry the thin film, when required. Examples of the solvent that can be properly used include: chlorine containing solvents such as methylene chloride, trichloroethylene and tetrachloroethane; ketone solvents such as acetone, methyl ethyl ketone and cyclohexanone; aromatic solvents such as toluene; cycloalkanes such as cycloheptane; and N-methylpyrrolidone, tetrahydrofuran and others.

One of methods can be adopted in which a heat-melt of a liquid crystal polymer and preferably a heat-melt in a state exhibiting an isotropic phase is developed in a procedure in conformity with a procedure as described above, the developed film is further developed to a thinner film while a melting temperature is maintained, if necessary, and the thinner film is then solidified. The one method is a method using no solvent; therefore, a liquid crystal polymer can be developed by a method good in hygiene in a working environment as well.

Note that in development of a liquid crystal polymer, there can be adopted a superimposition scheme for cholesteric liquid crystal layers with alignment films interposed between layers for the purpose to realize a thinner, if necessary.

The obtained cholesteric liquid crystal layers can also be separated from a support base material/an alignment base material therefore used in film formation and transferred onto another optical material for use when required.

As laminating methods for cholesteric liquid crystal layers, exemplified are a method in which plural cholesteric liquid crystal layers prepared separately are adhered to each other with an adhesive or a pressure-sensitive adhesive, a method for contact bonding cholesteric liquid crystal layers with each other after surfaces thereof are swollen or dissolved with a solvent or the like and a method for contact bonding cholesteric liquid crystal layers in heating or under an influence of supersonic wave. In addition, a method can be used in which after a cholesteric liquid crystal layer is prepared, cholesteric liquid crystal layers having different selective reflection central wavelength are superimposed.

Hereinafter, description will be given of a polymerizable mesogen compound (a), a polymerizable chiral agent (b) of which a cholesteric liquid crystal layer is made.

A polymerizable mesogen compound (a), when being used, preferably has at least one polemerizable functional group and in addition, a mesogen group including a ring unit and others. As polymerizable functional groups, exemplified are an acryloyl group, a methacryloyl group, an epoxy group, a vinyl ether group and others, among which preferable are an acryloyl group and a methacryloyl group. With a polymerizable mesogen compound (a) having two or more polymerizable functional groups employed, a crosslinked structure is introduced into a cholesteric liquid film to thereby enable durability thereof to be enhanced, as well. Examples of the ring unit constituting a mesogen group include: a biphenyl-based ring unit, a phenylbenzoate-based ring unit, a phenylcyclohexane-based ring unit, an azoxybenzene-based ring unit, an azomethine-based ring unit, an azobenzene-based ring unit, a phenylpyrimidine-based ring unit, a diphenylacetylene-based ring unit, a diphenylbenzoate-based ring unit, a bicyclohexane-based ring unit, a cyclohexylbenzene-based ring unit, a terphenyl-based ring unit and others. Note that an end of each of the ring units may has any of substituents such as a cyano group, an alkyl group, an alkoxy group, a halogen group. A mesogen group described above may bond with a spacer portion imparting bendability. As spacer portions, exemplified are a polymethylene chain, a polyoxymethylene chain and others. The number of repeated structural units constituting a spacer portion is properly determined according to a chemical structure of a mesogen moiety, wherein the number of repetition units in a polymethylene chain ranges from 0 to 20 and preferably from 2 to 12 and the number of repetition units in a polyoxymethylene chain ranges from 0 to 10 and preferably 1 to 3.

Molar absorption coefficients of the polymerizable mesogen compound (a) are preferably in the range of from 0.1 to 500 $dm^3$ $mol^{-1}$ $cm^{-1}$ at 365 nm, in the range of from 10 to 30,000 $dm^3$ $mol^{-1}$ $cm^{-1}$ at 334 nm, and in the range of from 1,000 to 100,000 $dm^3$ $mol^{-1}$ $cm^{-1}$ at 314 nm. A polymerizable mesogen compound (a) with the molar absorption coefficients has an ultraviolet absorbing function. Molar absorption coefficients of a polymerizable mesogen compound (a) are more preferably in the range of from 0.1 to 50 $dm^3$ $mol^{-1}$ $cm^{-1}$ at 365 nm, in the range of from 50 to 10,000 $dm^3$ $mol^{-1}$ $cm^{-1}$ at 334 nm, and in the range of from 10,000 to 50,000 $dm^3$ $mol^{-1}$ $cm^{-1}$ at 314 nm. Molar absorption coefficients of a polymerizable mesogen compound (a) are further more preferably in the range of from 0.1 to 10 $dm^3$ $mol^{-1}$ $cm^{-1}$ at 365 nm, in the range of from 1,000 to 4,000 $dm^3$ $mol^{-1}$ $cm^{-1}$ at 334 nm, and in the range of from 30,000 to 40,000 dm³ mol⁻¹ cm⁻¹ at 314 nm. If the molar absorption coefficients are less than 0.1 dm³ mol⁻¹ cm⁻¹ at 365 nm, 10 dm³ mol⁻¹ cm⁻¹ at 334 nm, and 1,000 dm³ mol⁻¹ cm⁻¹ at 314 nm, a sufficient difference in polymerization rate is realized, which makes it difficult to realize a broad band. On the other hand, if the molar absorption coefficients are larger than 500 dm³ mol⁻¹ cm⁻¹ at 365 nm, 30,000 dm³ mol⁻¹ cm⁻¹ at 334 nm, and 100,000 dm³ mol⁻¹ cm⁻¹ at 314 nm, polymerization may not advance perfectly with the result of no completion of curing. Note that molar absorption coefficients are obtained by measuring spectrophotometric spectrum of each material, followed by calculation based on absorbance values obtained at 365 nm, 334 nm and 314 nm.

A polymerizable mesogen compound (a) having one polymerizable functional group is expressed, for example, by the following formula:

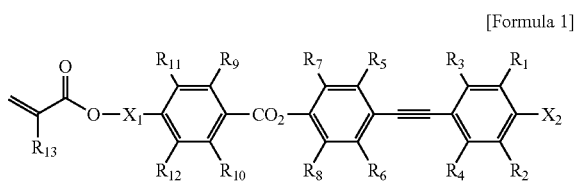

[Formula 1]

(wherein $R_1$ to $R_{12}$, which may be the same as or different from one another, indicates —F, —H, —CH₃, —C₂H₅, or —OCH₃, $R_{13}$ indicates —H or —CH₃, $X_1$ indicates a general formula (2) of —(CH₂CH₂O)$_a$—(CH₂)$_b$—(O)$_c$— and $X_2$ indicates —CN or —F, providing that a in the general formula (2) is an integer from 0 to 3, b therein is an integer from 0 to 12 and c therein is 0 or 1, wherein when a=1 to 3, b=0 and c=0 while when a=0, b=1 to 12 and c=0 to 1.)

As a polymerizable chiral agent (b), exemplified is LC756 manufactured by BASF Corp.

A mixing amount of a polymerizable chiral agent (b) is preferably in the range of from 1 to 20 parts by weight and more preferably in the range of from 2 to 5 parts by weight relative to 100 parts by weight of a total amount of a polymerizable mesogen compound (a) and the polymerizable chiral agent (b). A helical twist power (HTP) is controlled by a ratio of a polymerizable mesogen compound (a) and a polymerizable chiral agent (b). By adjusting the proportion within the range, a reflection band can be selected so that a reflectance spectrum of an obtained cholesteric liquid crystal film can cover a long wavelength band.

A liquid crystal mixture usually contains a photopolymerization initiators (c). As the photopolymerization initiators (c), exemplified are IRGACURE 184, IRGACURE 907, IRGACURE 369, IRGACURE 651 and others manufactured by Chiba Specialty Chemicals. A mixing amount of a photopolymerization initiator is preferably in the range of from 0.01 to 10 parts by weight and more preferably in the range of from 0.05 to 5 parts by weight relative to 100 parts by weight of a total amount of a polymerizable mesogen compound (a) and a polymerizable chiral agent (b).

The mixture can be used as a solution. Examples of solvents each of which are preferably used in preparation of the solution, usually includes: halogenated hydrocarbons such as chloroform, dichloromethane, dichloroethane, tetrachloroethane, trichloroethylene, tetrachloroethylene, chlorobenzene and the like; phenols such as phenol, parachlorophenol and the like; aromatic hydrocarbons such as benzene, toluene, xylene, methoxybenzene, 1,2-dimethoxybenzene and the like; in addition thereto acetone, methyl ethyl ketone, ethyl acetate, tert-butyl alcohol, glycerin, ethylene glycol, triethylene glycol, ethyleneglycol monomethyl ether, diethyleneglycol dimethyl ether, ethyl cellosolve, butyl cellosolve, 2-pyrrolidone, N-methyl-2-pyrolidone, pyridine, triethylamine, tetrahydrofuran, dimethylformamide, dimethylacetoamide, dimethyl sulfoxide, acetonitorile, butyronitrile, carbon disulfide, cyclopentanone, cyclohexanone, and the like. No specific limitation is imposed on a solvent to be used and preferable are methyl ethyl ketone, cyclohexanone, cyclopentanone and the like. Since a concentration in a solution is dependent on a dissolubility of a thermotropic liquid crystal compound and a film thickness of a cholesteric liquid crystal film, which is a final object, the concentration cannot be definitely determined, but is generally preferably on the order in the range of from 3 to 50 wt %.

(Linearly Polarizing Element (A))

As linearly polarizing elements (A), any material can be used without limitation as far as it transmits or emits polarized light. A linearly polarized light reflection polarizer (A1) can be exemplified. In a case where such a linearly polarized light reflection polarizer (A1) is used in an optical element (X) as shown in FIG. 8, light condensed in a direction can be effectively extracted as described above by combining the optical element (X) with a reflecting plate or the like.

Examples of the linearly polarized light reflection polarizer (A1) include: a grid type polarizer; a multilayer thin film laminate with two or more layers made of two or more kinds of materials having a difference between refractive indexes; evaporated multilayer thin film having different refractive indexes used in a beam splitter or the like; a multi-birefringence layer thin film laminate with two or more layers made of two or more kinds of materials each having birefringence; a stretched resin laminate with two or more layers using two or more kinds of resins each having a birefringence; a polarizer separating linearly polarized light by reflecting/transmitting linearly polarized light in the axis directions perpendicular to each other; and others.

A uniaxially stretched multilayer laminate can be used that is obtained by uniaxially stretching a multilayer laminate obtained by alternately laminating materials generating a retardation by stretching represented by polyethylene naphthalate, polyethylene terephthalate and polycarbonate; and resins each generating a low retardation, such as an acrylic resin represented by polymethacrylate; and a norbornene resin and others represented by ARTON manufactured by JSR Corp. As concrete examples of the linearly polarized light reflection polarizer (A1), exemplified are DBEF (Dual Brightness Enhancement film) manufactured by 3M Corp., PCF manufactured by NITTO DENKO CO., LTD. or the like.

As a linearly polarizing element (A), exemplified is a linearly polarized light absorption polarizer. A linearly polarized light absorption polarizer is usually employed on both sides of a liquid crystal cell and detailed description will be given of this later. In a case where a linearly polarized light absorption polarizer is employed, it is advantageous in that angular dependency of transmittance is large due to high polarization degree.

As linearly polarizing elements (A), further exemplified are polarized light emitting elements. As polarized light emitting elements, exemplified, to be concrete, are linearly polarized light emitting elements obtained in procedures in which a dichroic light emitting dye is mixed into a liquid crystal monomer, the mixture is subjected to uniaxially alignment, thereafter the alignment layer is cured and fixed, and the layer is then illuminated with ultraviolet, and in which a dichroic light emitting dye is mixed into a polymer, having a straight chain such as polyethylene terephthalate, polyethylene naphthalate, polypropylene, polystyrene and the like, and good in alignment, then alignment is implemented and fixed by stretch film forming to form a film and the film obtained is illuminated with ultraviolet; and a polarized light emitting organic EL (Electro-Luminescent) element obtained by applying alignment film forming to a dichroic light emitting dye and the like. A polarized light emitting element is advantageously used because of good light utilization efficiency.

As a linearly polarizing element (A), still further exemplified is a total light transmission polarizing element. In a case where a total light transmission polarizing element is employed, it is advantageous because of good light utilization efficiency.

(Lamination of Layers)

An optical element of the present invention is not only disposed in an optical path in a simple manner, but can also be used by adhering. This is because since the optical element controls transmittance with a polarization characteristic thereof without using a surface profile, no air interface is required.

Lamination of each of the layers may be realized only by being laminated on a preceding layer, while it is preferable to laminate the layers with an adhesive agent or a pressure-sensitive adhesive agent from the viewpoint of workability and light utilization efficiency. In that case, it is desirable from the viewpoint of suppressed surface reflection that an adhesive agent or a pressure-sensitive adhesive agent is transparent and does not have absorption in the visible light region, and have refractive indexes closest possible to refractive indexes of the layers. Preferably used from the view point are an acrylic pressure-sensitive adhesive agent and the like. The following methods can be adopted: one method in which each of the layers forms monodomain with the help of an alignment film separately from the others and sequentially laminated by transfer the layers onto a light transparent base material; and the other in which each of the layers is sequentially formed directly on a preceding layer while forming an alignment film or the like for alignment in a proper manner.

It is possible to further add particles for adjusting diffusibility, when required, to thereby impart isotropic scatterbility, and to properly add an ultraviolet absorbent, an antioxidant, and a surfactant for a purpose to impartation of a leveling property in film formation, in each of the layers and (pressure-sensitive) adhesive layers.

(Light Condensation Backlight System)

A diffusion reflector plate is preferably disposed on a light source (on the other side of the light source from the side on which a liquid crystal cell is disposed). A main component of light reflected on a light collimating film is an obliquely incident component and regularly reflected on the light collimating film and returned in the backlight direction. Herein, in a case where a regular reflectance of a reflecting plate on the rear side is high, a reflection angle is kept as is and the reflected light cannot be emitted in the front direction only to end up with lost light. Therefore, a diffusion reflector plate is desirably disposed in order not to hold a reflection angle of reflected-back light as is and to thereby increase a scattering reflection component in the front direction.

Light condensation characteristic according to the present invention can controllably condense light in the front direction even in a case of a diffusion surface light source such as a direct under type backlight or an inorganic/organic EL element.

It is desired to insert a proper diffusing plate (D) between an optical element (X) of the present invention and a backlight source (L). This is because light passes through obliquely, reflected light is scattered in the vicinity of a backlight guide and part of the reflected light is scattered in the vertically incident direction to thereby enhance a light recycling efficiency. As diffusing plates, exemplified are a plate having a surface unevenness shape and a plate made of a resin in which fine particles different in refractive index embedded. A diffusing plate may be inserted between the optical element (X) and a backlight or adhered to the optical element (X).

In a case where a liquid crystal cell (LC) to which an optical element (X) is adhered is disposed in the proximity of the backlight, while there arises a chance to generate Newton's rings in a clearance between a film surface and the backlight, generation of Newton's rings can be suppressed by disposing a diffusing plate having a surface unevenness on a surface of a light guide plate of the optical element (X) in the present invention. A layer that has both of a surface unevenness and a light diffusing structure may be formed on a surface itself of an optical element (X) in this invention.

(Liquid Crystal Display)

The optical element (X) is preferably applied to a liquid crystal display in which polarizing plates (P) are disposed on both sides of a liquid crystal cell (LC), and the optical element (X) is disposed on the polarizing plate (P) side on the light source side surface of the liquid crystal cell. FIG. 9 is a state where a polarizing plate (P) is laminated on a linearly polarizing element (A). Note that in a case where a polarizing plate (P) is as a linearly polarizing element (A), that is a linearly polarized light absorption polarizer is employed, no polarizing plate (P) is required to be laminated on the linearly polarizing element (A).

In FIGS. 11 to 14, there is exemplified liquid crystal displays. There are shown a reflecting plate (RF) together with a light source (L). FIG. 11 shows a case where a direct under type backlight (L) is employed as a light source (L). FIG. 12 shows a case where a sidelight type light source (L) is employed as a light guide plate (S). FIG. 13 shows a case where a surface light source (L) is employed. FIG. 14 shows a case where a prism sheet (Z) is employed.

By laminating a diffusion plate having neither backscattering nor polarization cancellation on a viewer side of the liquid crystal cell of a liquid crystal display combined with the light collimating backlight system, light having a good display characteristic in the vicinity of the front is diffused to obtain a good and uniform display characteristic in all the viewing angle range, thereby enabling a viewing angle magnification to be realized.

A viewing angle magnifying layer used here is a diffusion plate having substantially no backscattering. A diffusion plate can be provided with a diffusion pressure-sensitive material. An arrangement place thereof can be used above or below a polarizing plate on the viewer side of the liquid crystal display. In order to prevent reduction in contrast due to an influence such as bleeding of pixels or a slightly remaining backscattering, the diffusion plate is desirably provided in a layer at a position closest possible to a cell such as between a polarizing plate and a liquid crystal cell. In this case, it is desirable to use a film that does not substantially cancel polarization. A fine particle distribution type diffusion plate is preferably used, which is disclosed in, for example, the publications of JP-A No. 2000-347006 and JP-A No. 2000-347007.

In a case where a viewing angle magnifying layer is disposed outside of a polarizing plate, a viewing angle compensating retardation plate may not be used especially if a TN liquid crystal cell is used since collimated lights are transmitted through a liquid crystal cell and through the polarizing plate. If an STN liquid crystal cell is used in the case, it has only to use a retardation film that is well compensated with respect to a front characteristic. Since, in this case, a viewing angle magnifying layer as a surface exposed to air, a type having a refractive effect due to a surface profile can also be employed.

On the other hand, in a case where a viewing angle magnifying film is inserted between a polarizing plate and a liquid crystal cell, light is diffused light at the stage where light is transmitted through the polarizing plate. If a TN liquid crystal is used, a necessity arises for compensating a viewing angle characteristic of the polarizer itself. In this case, it is preferable to insert a retardation plate to compensate a viewing angle characteristic of a polarizing plate between the polarizing plate and the viewing angle magnifying layer. If an STN liquid crystal is used, it is preferable to insert a retardation plate (C) to compensate a viewing angle characteristic of the polarizing plate (PL) in addition to a front retardation compensation for the STN liquid crystal.

In a case of a viewing angle magnifying film having a regular structure in the interior thereof such as a microlens array or a hologram film, both conventionally having been available, interference has occurred with a fine structure such as a microlens array, a prism array, a louver, a micromirror array or the like that is included in a black matrix of a liquid crystal display or a collimation system of a conventional backlight to thereby cause a moiré pattern with ease. Since in a collimating film in this invention, a regular structure is not visually recognized in a plane thereof and emitted light has no regularity modulation, no necessity arises for consideration of matching with a viewing angle magnifying layer or an arrangement sequence. Therefore, a viewing angle magnifying layer has a lot of options since no specific limitation is imposed thereon, if neither interference nor a moiré pattern occurs with a pixel black matrix of a liquid crystal display.

In this invention, as viewing angle magnifying layers, preferably used are a light scattering plate, having no substantial backscattering and not canceling polarization, which is described in any of the publications of JP-A Nos. 2000-347006 and 2000-347007 and which has a haze in the range of 80% to 90%. Any of layers each of which has a regular structure in the interior thereof such as a hologram sheet, a microprism array, a microlens array or the like can be used, if neither interference nor a moiré pattern occurs with a pixel black matrix of a liquid crystal display.

(Other Materials)

Note that various other kinds of optical layers are properly employed according a common method to thereby, manufacture a liquid crystal display.

Commonly used is a polarizing plate having a protective film on one side or both sides of a polarizer.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film on which dichromatic materials such as iodine is absorbed and oriented after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As the transparent protective film prepared on one side or both sides of the polarizer, materials is excellent in transparency, mechanical strength, heat stability, water shielding property, isotropy, etc. may be preferably used. As materials of the above-mentioned transparent protective film, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo- type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned as a. Films made of heat curing type or ultraviolet ray curing type resins, such as acryl based, urethane based, acryl urethane based, epoxy based, and silicone based, etc. may be mentioned as materials of the above-mentioned transparent protective film.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in side chain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

In general, a thickness of the protection film, which can be determined arbitrarily, is 500 μm or less, preferably 1 through 300 μm, and especially preferably 5 through 200 μm in viewpoint of strength, work handling and thin layer Moreover, it is preferable that the protective film may have as little coloring as possible. Accordingly, a protective film having a retardation value in a film thickness direction represented by Rth=[(nx+ny)/2−nz] x d of −90 nm through +75 nm (where, nx and ny represent principal indices of refraction in a film plane, nz represents refractive index in a film thickness direction, and d represents a film thickness) may be preferably used. Thus, coloring (optical coloring) of polarizing plate resulting from a protective film may mostly be cancelled using a protective film having a retardation value (Rth) of −90 nm through +75 nm in a thickness direction. The retardation value (Rth) in a thickness direction is preferably −80 nm through +60 nm, and especially preferably −70 nm through +45 nm.

As a protective film, if polarization property and durability are taken into consideration, cellulose based polymer, such as triacetyl cellulose, is preferable, and especially triacetyl cellulose film is suitable. In addition, when the protective films are provided on both sides of the polarizer, the protective films comprising same polymer material may be used on both of a front side and a back side, and the protective films comprising different polymer materials etc. may be used. Adhesives are used for adhesion processing of the above described polarizer and the protective film. As adhesives, isocyanate derived adhesives, polyvinyl alcohol derived adhesives, gelatin derived adhesives, vinyl polymers derived latex type, aqueous polyurethane based adhesives, aqueous polyesters derived adhesives, etc. may be mentioned.

A hard coat layer may be prepared, or antireflection processing, processing aiming at sticking prevention, diffusion or anti glare may be performed onto the face on which the polarizing film of the above described transparent protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the transparent protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the transparent protective film.

A retardation plate is laminated on a polarizing plate as a viewing angle compensating film and used as a wide viewing angle polarizing plate. A viewing angle compensating film is a film for magnifying a viewing angle so as to enable an image to be viewed with relatively sharpness even in a case where a screen image of a liquid crystal display is viewed not in a direction normal to the screen but in a slightly oblique direction relative to the screen.

As the retardation plates, employed are a λ/4 plate and a λ/2 plate that are proper and meet the purpose of use. For example, two kinds or more of retardation plates are laminated to thereby enable an optical characteristic such as a retardation to be controlled. As retardation plates, exemplified are a birefringent film obtained by stretching a film made of one of proper polymers such as polycarbonate, norbornene-based resin, polyvinyl alcohol, polystyrene, poly(methyul methacrylate), polypropylene and other polyolefins, polyallylate and polyamide; an alignment film made of a liquid crystal material such as a liquid crystal polymer; an alignment layer of a liquid crystal material supported on a film and the like. A thickness of a retardation plate is usually preferably in the range of from 0.5 to 200 μm and especially preferably in the range of from 1 to 100 μm.

A retardation plate functioning as a λ/4 plate in a broad range of the visible light region can be obtained, for example, by superimposing a retardation layer functioning as a λ/4 plate for monochromatic light at a wavelength of 550 nm and a retardation layer showing a different retardation characteristic, for example, a retardation layer functioning as a λ/2 plate on each other. Therefore, a retardation plate disposed between a polarizing plate and a brightness enhancement film may be constituted of one, or two or more retardation layers.

As such viewing angle compensating retardation plates, there are available, in addition thereto, a film having a birefringence obtained by a biaxially stretching treatment, a stretching treatment in two directions perpendicular to each other or the like and a biaxially stretched film such as an inclined alignment film. As inclined alignment film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

No specific limitation is, in addition to the above described condition, imposed on optical layers laminated when being actually used and there can be used one, or two or more optical layers that have an opportunity to be used in formation of a liquid crystal display and others, such as a reflection plate and a transflective plate. Examples thereof especially include: a reflection type polarizing plate and a transflective type polarizing plate obtained by laminating a reflection plate and a transflective plate, respectively, on an elliptic polarizing plate or a circular polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a transflective type elliptically polarizing plate, etc. in which the above-mentioned reflection type polarizing plate or a transflective type polarizing plate is combined with above described retardation plate respectively.

The elliptically polarizing plate or transflective type elliptically polarizing plate is laminated the polarizing plate or reflection type polarizing plate and the retardation plate by appropriately combination. As to the elliptically polarizing plate or the like, a (reflection type) polarizing plate and a retardation plate described above can be formed by sequentially laminating layers one at a time in a manufacturing process for a liquid crystal display, an optical film such as an elliptic polarizing plate or the like obtained by lamination in advance has an advantage of being excellent in quality stability, workability in lamination and others and enabling a production efficiency of a liquid crystal display to be improved.

A pressure-sensitive adhesive layer or an adhesive layer can also be provided in an optical element of this invention. A pressure-sensitive layer can be used for adherence to a liquid crystal cell and in addition, is used in lamination of optical layers. In adherence of the optical film, the optical axis thereof can be set at a proper arrangement angle in adaptation for a retardation characteristic as a target.

As the pressure sensitive adhesive agent or the adhesive agent is not especially limited. For example, polymers such as acrylic type polymers; silicone type polymers; polyesters, polyurethanes, polyamides, polyvinyl ethers, vinyl acetate/vinyl chloride copolymers, modified polyolefines, epoxy type; and rubber type such as fluorine type, natural rubber, synthetic rubber may be suitably selected as a base polymer. Especially, the one which is excellent in optical transparency, showing adhesion characteristics with moderate wettability, cohesiveness and adhesive property and has outstanding weather resistance, heat resistance, etc. may be preferably used.

The pressure sensitive adhesive agent or the adhesive agent adhesive may contain cross-linking agent according to a base polymer. And the adhesive agent adhesive may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

An adhesive agent and a pressure-sensitive adhesive agent each are usually used as an adhesive agent solution of a base polymer or a composition thereof dissolved or dispersed in a solvent at a solid matter concentration of the order in the range of from 10 to 50 wt %. An organic solvent can be properly selected from the group consisting of toluene, ethyl acetate and others; water; or others, so as to be adapted for a kind of an adhesive agent for use.

An adhesive layer and pressure-sensitive adhesive layer may also be prepared on one side or both sides of a polarizing plate or an optical film as a layer in which pressure sensitive adhesives with different composition or different kind etc. are laminated together. Moreover, when adhesive layers are prepared on both sides, adhesive layers that have different compositions, different kinds or thickness, etc. may also be used on front side and backside of a polarizing plate or an optical film. Thickness of an adhesive layer may be suitably determined depending on a purpose of usage or adhesive strength, etc., and generally is 1 to 500 µm, preferably 5 to 200 µm, and more preferably 10 to 100 µm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

EXAMPLES

Description will be given, in a concrete manner, of the present invention using examples and comparative examples below and it should be understood that this invention is not limited by the examples in any way. Measurements are as described below.

(Reflection Wavelength Band)

A reflectance spectrum was measured with a spectrophotometer (manufactured by Otsuka Electronics Co., Ltd. with a trade name of Instant multi-photometric system MCPD-2000) and a wavelength band that includes a reflectance ½ times the maximum reflectance was determined as a reflection wavelength band.

(Nz Coefficient)

An Nz coefficient is a value expressed by $Nz=(nx-nz)/(nx-ny)$ wherein a direction in which an in-plane refractive index is maximized is x axis, a direction perpendicular to the x axis is y axis and the thickness direction is z axis and refractive indexes in the respective axes are nx, ny and nz by definition. A retardation of a wavelength plate was obtained by measuring the refractive indexes nx, ny and nz with an automatic birefringence measuring instrument (manufactured by Oji Scientific Instruments. with a trade name of Automatic Birefringence Meter KOBRA21ADH) at a wavelength of 550 nm wherein a direction in which an in-plane refractive index is maximized is x axis, a direction perpendicular to the x axis is y axis and the thickness direction is z axis and refractive indexes in the respective axes are nx, ny and nz by definition.

Example 1

(Rotatory Polarization Plate (B))

Mixed together were 100 parts by weight of a photopolymerizable nematic liquid crystal monomer (manufactured by BASF Co., with a trade name of LC242) and 3 parts by weight of a chiral agent (manufactured by BASF Co. with a trade name of LC756) to thereby prepare a liquid crystal mixture having a selective reflection central wavelength of a cholesteric liquid crystal polymer to be obtained of 900 nm. The liquid crystal mixture was dissolved in cyclopentanone to form a 20 wt % solution and thereafter, added into the solution were a reaction initiator (manufactured by Chiba Specialty Chemicals. with a trade name of IRGACURE 907 at 3 wt % relative to the mixture) and 0.05 part by weight of a surfactant to thereby obtain a coating solution.

The coating solution was applied on an alignment base member with a wire bar to a dry thickness of 4 µm, the wet coat was dried in a drier to remove the solvent and the liquid crystal was aligned. The alignment base substrate was prepared by rubbing a polyethylene terephthalate (PET) film having a thickness of 75 µm (manufactured by TORAY INDUSTRIES Inc. with a trade name of Lumirror) with a rayon rubbing cloth.

Then, the coat was illuminated with UV to fix the alignment state. The coating liquid was further applied thereon to a dry thickness of 4 µm and the wet coat was dried in the drier to remove the solvent and the liquid crystal was aligned. Such a set of operations was repeated seven times to finally obtain a rotatory polarization plate (B) with angular dependency having a total thickness of 28 µm. A selective reflection wavelength band was in the range of from 800 to 1,000 nm. The rotatory polarization plate (B) with angular dependency rotates linearly polarized light by 90° in the normal direction and by about 0° in a direction of an angle of 30° or more (see FIG. 3).

(Linearly Polarized Light Reflection Polarizer (A1))

DBEF manufactured by 3M Corp. was used.

(Optical Element (X))

The rotatory polarization plate (B) with angular dependency was adhered to the linearly polarized light reflection polarizer (A1) in an arbitrary direction using an acrylic-based pressure-sensitive adhesive manufactured by NITTO DENKO CO., LTD. with a product No. 7 having a thickness of 5 µm. The linearly polarized light reflection polarizer (A1) was adhered with a similar pressure-sensitive adhesive to thereby obtain an optical element (X1) as shown in FIG. 8. The two linearly polarized light reflection polarizers (A1) were adhered so that the polarized light transmission axes are perpendicular to each other.

A polarizing plate (P) was, as shown in FIG. 9, adhered on a linearly polarized light reflection polarizer (A1) on the viewer side of the optical element (X1) so that the polarization axis of the polarizing plate (P) and the polarized light transmission axis of the linearly polarized light reflection polarizer (A1) are in parallel to each other using an acrylic-based pressure-sensitive adhesive manufactured by NITTO DENKO CO., LTD. with a product No. 7 having a thickness of 20 µm. The polarizing plate (P) was NPF-TEG1465DU manufactured by NITTO DENKO CO., LTD.

Comparative Example 1

Linearly polarized light reflection polarizers (A1), which were used in Example 1, were adhered to each other so that the polarized light transmission axes are in parallel to each other using an acrylic-based pressure-sensitive adhesive manufactured by NITTO DENKO CO., LTD. with a product No. 7 having a thickness of 5 μm to thereby obtain an optical element (Y1) as shown in FIG. 10. In addition, a polarizing plate (P) was adhered to an optical element (Y1) in a similar way to that in Example 1.

(Evaluation)

The optical element (X1) attached with the polarizing plate (P) having been obtained in Example 1 and the optical element (Y1) attached with the polarizing plate (P) having been obtained in Comparative Example 1 each were disposed on a diffusion light source. A brightness vs. viewing angle characteristic was measured with a light table KLV7000 manufactured by Hakuba USA Inc. as a light source device (diffusing light source). Transmittance at various incidence angles was measured with MCPD 3000 manufactured by Otsuka Electronics Co., Ltd. Results are shown in FIG. 15. It is found that that in Example 1, transmittance decreases with increase in angle, which shows that there is an angular dependency of transmittance, as compared with the case of Comparative Example 1.

A brightness vs. viewing angle characteristic was measured using EZ contrast manufactured by ELDIM Co. Results are shown in FIG. 16. It is found that in Example 1, a brightness value decreases with increase in angle, a brightness value is higher in the normal direction, which shows that there is an angular dependency of transmittance, as compared with the case of Comparative Example 1.

Example 2

An optical element (X2) was obtained in a similar way to that in Example 1 with the exception that in Example 1, a polarizing plate NPF manufactured by NITTO DENKO CO., LTD. as a linearly polarized light reflection polarizer (A1).

Comparative Example 2

Linearly polarized light reflection polarizers (A1), which were used in Example 2, were adhered to each other so that the polarized light transmission axes of thereof are in parallel to each other using an acrylic-based pressure-sensitive adhesive manufactured by NITTO DENKO CO., LTD. with a product No. 7 having a thickness of 5 μm to thereby obtain an optical element (Y2) as shown in FIG. 10. In addition, a polarizing plate (P) was adhered to an optical element (Y2) in a similar way to that in Example 1.

(Evaluation)

The optical element (X2) having been obtained in Example 2 and the optical element (Y2) having been obtained in Comparative Example 1 each were disposed on a diffusion light source. A brightness vs. viewing angle characteristic was measured with a light table KLV7000 manufactured by Hakuba USA Inc. as a light source device (diffusing light source). Transmittance at various incidence angles was measured with MCPD 3000 manufactured by Otsuka Electronics Co., Ltd. Results are shown in FIG. 17. It is found that that in Example 2, transmittance decreases with increase in angle, which shows that there is an angular dependency of transmittance, as compared with the case of Comparative Example 2.

Comparative Example 3

A ½ wavelength plate made of polycarbonate was adhered to a linearly polarized light reflection polarizer (A1), which was used in Example 1, using an acrylic-based pressure-sensitive adhesive manufactured by NITTO DENKO CO., LTD. with a product No. 7 having a thickness of 20 μm so that the polarized light transmission axis of the linearly polarized light reflection polarizer (A1) and the axis of the ½ wavelength plate form an angle of 45°. A linearly polarized light reflection polarizer (A1), which was used in Example 1, was adhered thereon using a similar pressure-sensitive adhesive to obtain an optical element (Y3) so that the polarization axis of the linearly polarized light reflection polarizer (A1) and the axis of the ½ wavelength plate form an angle of 45°. A polarizing plate (P) was adhered to the viewer side of the optical element (Y3) in a similar way to that in Example 1. Note that in the same process, optical elements (Y3) were fabricated using ½ wavelength plates with three different Nz coefficients (−1.0, 0.5 and 1.0).

(Evaluation)

The optical element (X1) attached with the polarizing plate (P) having been obtained in Example 1 and the optical element (Y3) attached with the polarizing plate (P) having been obtained in Comparative Example 3 each were disposed on a diffusion light source. A brightness vs. viewing angle characteristic was measured with a light table KLV7000 manufactured by Hakuba USA Inc. as a light source device (diffusing light source). A brightness vs. viewing angle characteristic was measured using EZ contrast manufactured by ELDIM Co. Results are shown in FIG. 18. It is found that that in Comparative Example 3, no light condensation occurs, as compared with the case of Example 1. In addition, it is found that there is no brightness enhancement.

Comparative Example 4

The sample described below was fabricated according to an example in the pamphlet of WO 03/27756 A1. A rotatory polarizer was adhered to DBEF, which was used in Example 1 and DBEF was further adhered to the rotatory polarizer. Used for adherence was an acrylic-based pressure-sensitive adhesive manufactured by NITTO DENKO CO., LTD. with a product No. 7 having a thickness of 25 μm and an angle formed between the polarized light transmission axes of DBEFs were adjusted so as to maximize transmittance.

The rotatory polarizer was fabricated as described below: A liquid crystal monomer (manufactured by BASF Co. with a trade name of LC242), a chiral agent (manufactured by BASF Co. with a trade name LC756) and a polymerization initiator (manufactured by Chiba Specialty Chemicals. with a trade name of IRGACURE 369) in wt ratio of 96.4:0.1:3.5 were dissolved in a solvent (methyl ethyl ketone) so as to prepare a 20 wt % solution. The solution was coated on a PET base member (manufactured by TORAY INDUSTRIES Inc. with a trade name of Lumirror) to a thickness of 75 μm with a wire bar coater, the wet coat was heated at 80° C. for 2 min to remove and dry the solvent, the coat was polymerized for curing with an ultraviolet illuminator in a nitrogen gas environment after purging with nitrogen gas. A thickness of the obtained liquid crystal cured layer was about 5 μm. A rotatory strength of the sample was about 80°.

The optical element obtained by laminating DBEF, a polarizer and DBEF had a selective reflection function in the wavelength range of from 380 to 1100 nm. The optical element exhibits almost the same performance as a polarizing element obtained by adhering DBEFs to each other at an angle between the axes of about 80°. The polarizing plate (P) was adhered on the viewer side of the optical element in a similar way to that in Example 1.

(Evaluation)

The optical element (X1) attached with the polarizing plate (P) having been obtained in Example 1 and the optical element attached with the polarizing plate (P) having been obtained in Comparative Example 4 each were disposed on a diffusion light source. A brightness vs. viewing angle characteristic was measured with a light table KLV7000 manufactured by Hakuba USA Inc. as a light source device (diffusing light source). A brightness vs. viewing angle characteristic was measured using EZ contrast manufactured by ELDIM Co. Results are shown in FIG. 19. In Comparative Example 4, there arose no peculiar angular dependency, which occurred in Example 1. In addition, there was no peculiar angular dependency of transmittance either.

What is claimed is:

1. A rotatory polarization plate, capable of extracting a polarized light from an incident polarized light and rotating an azimuth angle of a polarization axis of the incident polarized light, wherein a rotatory polarization angle of the azimuth angle is changed by an incidence angle of the incident polarized light, wherein the azimuth angle of the polarization axis of linearly polarized light is rotated by about 90° when, in the normal direction, the linearly polarized light passes through the rotatory polarization plate, and being rotated by about 0° when, at the incidence angle larger than 30°, the linearly polarized light passes through the rotatory polarization plate, wherein the rotatory polarization plate is formed with a cholesteric liquid crystal layer, and wherein all of a selective reflection wavelength band of the rotatory polarization plate is in a wavelength region longer than 610 nm.

2. An optical element comprising: a linearly polarizing element (A) and the rotatory polarization plate (B) according to claim 1.

3. The optical element according to claim 2, comprising: the rotatory polarization plate (B) according to claim 1; and two or more linearly polarizing elements (A), wherein the rotatory polarization plate (B) is disposed between two adjacent linearly polarizing elements (A).

4. The optical element according to claim 2, wherein the linearly polarizing element (A) is a linearly polarized light reflection polarizer.

5. The optical element according to claim 2, wherein the linearly polarizing element (A) is a linearly polarized light absorption polarizer.

6. The optical element according to claim 2, wherein the linearly polarizing element (A) is a polarized light emitting element.

7. The optical element according to claim 2, wherein each of layers is laminated with a light translucent adhesive or pressure-sensitive adhesive.

8. A light condensation backlight system comprising at least: a light source and the optical element according to claim 2.

9. A liquid crystal display comprising at least: a liquid crystal cell and the light condensation backlight system according to claim 8.

10. The liquid crystal display according to claim 9, further comprising a diffusion plate having substantially neither backscattering nor polarization cancellation laminated on a viewer side of the liquid crystal cell.

* * * * *